(12) United States Patent
Lee et al.

(10) Patent No.: US 8,738,932 B2
(45) Date of Patent: May 27, 2014

(54) SYSTEM AND METHOD FOR PROCESSOR-BASED SECURITY

(75) Inventors: Ruby B. Lee, Princeton, NJ (US); Champagne David, London (GB)

(73) Assignee: Teleputers, LLC, Princeton, NJ (US)

( * ) Notice: Subject to any disclaimer, the term of this patent is extended or adjusted under 35 U.S.C. 154(b) by 561 days.

(21) Appl. No.: 12/689,674

(22) Filed: Jan. 19, 2010

(65) Prior Publication Data

US 2010/0281273 A1 Nov. 4, 2010

Related U.S. Application Data

(60) Provisional application No. 61/145,273, filed on Jan. 16, 2009.

(51) Int. Cl.
*G06F 21/00* (2013.01)
(52) U.S. Cl.
USPC ........... 713/190; 713/193; 713/165; 713/164; 713/167; 713/176; 726/16
(58) Field of Classification Search
USPC .............. 713/164, 165, 167, 176; 726/16, 27
See application file for complete search history.

(56) References Cited

U.S. PATENT DOCUMENTS

| | | | |
|---|---|---|---|
| 2003/0101322 A1* | 5/2003 | Gardner | 711/163 |
| 2006/0026419 A1* | 2/2006 | Arndt et al. | 713/150 |
| 2008/0016337 A1* | 1/2008 | Morgan et al. | 713/158 |
| 2008/0244569 A1* | 10/2008 | Challener et al. | 718/1 |
| 2009/0164770 A1* | 6/2009 | Zimmer et al. | 713/2 |

OTHER PUBLICATIONS

Trusted Computing Group, "Trusted Platform Module (TPM) Main—Part 1 Design Principles," Specification version 1.2, Revision 94, Mar. 2006 (178 pages).
Sailer, et al., "Design and Implementation of a TCG-based Integrity Measurement Architecture," in Proceedings of the 13th USENIX Security Symposium, 2004 (17 pages).
Garfinkel, et al., "Terra: A Virtual Machine-Based Platform for Trusted Computing," in Proceedings of SOSP 2003, pp. 193-206, Oct. 2003 (14 pages).
Jaeger, et al., "PRIMA: Policy-Reduced Integrity Measurement Architecture," in Proceedings of the 11th ACM Symposium on Access Control Models and Technologies (SACM 2006), Lake Tahoe, California, 2006 (11 pages).

* cited by examiner

*Primary Examiner* — Carl Colin
*Assistant Examiner* — Ali Shayanfar
(74) *Attorney, Agent, or Firm* — McCarter & English, LLP

(57) ABSTRACT

A system and method for processor-based security is provided, for on-chip security and trusted computing services for software applications. A processor is provided having a processor core, a cache memory, a plurality of registers for storing at least one hash value and at least one encryption key, a memory interface, and at least one on-chip instruction for creating a secure memory area in a memory external to the processor, and a hypervisor program executed by the processor. The hypervisor program instructs the processor to execute the at least one on-chip instruction to create a secure memory area for a software area for a software module, and the processor encrypts data written to, and decrypts data read from, the external memory using the at least one encryption key and the verifying data read from the external memory using the at least one hash value. Secure module interactions are provided, as well as the generation of a power-on key which can be used to protect memory in the event of a re-boot event. Lightweight, run-time attestation reports are generated which include selected information about software modules executed by the processors, for use in determining whether the processor is trusted to provide secure services.

29 Claims, 12 Drawing Sheets

SYSTEM AND METHOD FOR PROCESSOR-BASED SECURITY

RELATED APPLICATIONS

This application claims the priority of U.S. Provisional Application Ser. No. 61/145,273 filed Jan. 16, 2009, the entire disclosure of which is expressly incorporated herein by reference.

STATEMENT OF GOVERNMENT INTERESTS

The present invention was made with government support under NSF and DARPA Contract Nos. CNS-0430487, CNS-0752961, and CNS-0917134. The government has certain rights in this invention.

BACKGROUND OF THE INVENTION

1. Field of the Invention

The present invention relates to improved security for computer systems. More specifically, the present invention relates to a system and method for processor-based security.

2. Related Art

Security of data is a very important in today's modern computer systems. So-called "trusted computing" represents a type of computer security that has gained recent interest. The Trusted Computing Group (TCG) industry consortium has defined standards for trusted computing platforms and applications. These include a hardware security chip called the Trusted Platform Module (TPM), which can be added to the motherboard of desktop and mobile computers. Software running on the CPU of a TPM-enhanced computer can request trusted computing services from the TPM chip, chief amongst which are referred to as sealed storage and attestation. Both of these services require the software stack corresponding to an executing piece of software to follow the TPM's measured boot procedure, where a cryptographic hash (measurement) computed over each layer of software launched is sent to the TPM chip.

In sealed storage, the TPM binds integrity measurements of a software stack to a key encrypting a set of data. Following a computer reboot, the key (and the data) can only be retrieved if current measurements of the software stack sent to the TPM chip match the measurements the key was bound to initially. In attestation, the TPM "signs" the software stack measurements it receives to create an attestation report, i.e., a report which identifies all software modules for which access has been requested by a remote party. This report can also include a computation result produced by the software stack, and can then be sent to a remote party to prove the identity of the software running on the platform and certify it produced a given computation result.

TPM-based approaches suffer from security vulnerabilities (e.g., the Cold Boot and TPM reset attacks) as well as performance, scalability and usability issues. Performance is very low, e.g., some operations take several hundred milliseconds, which is unacceptable in modern processors with sub-nanosecond processor cycle times. Scalability is limited, e.g., only a limited number of separate software contexts can be measured concurrently into the TPM. Limited resources and low performance are due to the TCG's goal of producing a very low cost security chip. It is also rather difficult to use TPM-based approaches—programming the TPM is not only unfamiliar but also relatively complex, which may partially explain the notable lack of adoption in software applications, despite being included on the motherboard of newer notebook computers. Several of these shortcomings of TPM-based trusted computing are believed to be due to implantation on a slow, low-cost chip that is separate from the main processor chip.

The security of TPM-based approaches relies on several assumptions that have proven easy to break when attackers have physical access to the platform they are targeting. The TPM threat model assumes that physical memory is secure: that RAM chips and buses cannot be physically probed to insert or extract data and they cannot be tampered with to alter their contents. Based on this assumption, cryptographic keys protected by TPM's sealed storage mechanism are written in plaintext to memory whenever the TPM determines the prevailing software stack has the same integrity measurements. Cold Boot attacks show that with very low-tech equipment costing only a few dollars, an attacker with physical presence can freeze the memory chip to increase its remanence. This gives the attacker time to scan the entire memory, and steal the plaintext keys still persisting in the memory chips. The Cold Boot exploit demonstrated that this technique could recover the root key used in disk encryption systems like Microsoft Vista's BitLocker.

Another assumption is that the TPM chip's reset signal is synchronized with the CPU chip's reset signal. Synchronization ensures that software stack measurements stored by the TPM are only wiped out from the TPM chip when the CPU's software stack is itself wiped out, on a CPU reset. In practice, most TPM chips are connected to Personal Computers (PCs) via the Low-Pin Count (LPC) bus. As demonstrated in the TPM reset attack, the reset signal on this bus can easily be "spoofed" by a physical attacker, without triggering a CPU reset. This allows the attacker to load a malicious software stack, reset the TPM to wipe out traces of this stack and then feed the reset TPM with measurements of a trusted software stack, as if this stack was currently in control of the CPU. To do so, the attacker in control of the malicious software stack can simply send to the TPM a set of measurements corresponding to the trusted software stack, previously recorded on a platform actually hosting such a software stack. These measurements include the identity of a trusted BIOS, OS loader and OS, as if they had been measured and sent to the TPM by the layers of software that are successively loaded upon a CPU reset. In reality, no CPU reset occurred: the measurements are fed successively to the TPM by an attacking program in the already fully booted malicious software stack.

A crucial assumption of the TPM threat model is that the Core Root of Trust for Measurement (CRTM)—also called the Static Root of Trusted (SRTM)—, which is located in a computer system's basic input-output system (BIOS), cannot be tampered with. Tampering with the CRTM allows breaking the security of TPM sealed storage and attestation in the many scenarios where the CRTM is responsible for bootstrapping the measurement procedure. An attacker with physical presence can de-solder the BIOS chip from the motherboard and replace it with a BIOS chip containing a malicious CRTM. Also, simpler methods have been used to successfully tamper with the CRTM with a software-only attack. The Dynamic Root of Trust for Measurement (DRTM) implemented on certain platforms (e.g., Intel TXT) can mitigate the effects of CRTM corruption, although practical attacks on the DRTM have been shown to be feasible.

The fixed amount of TPM registers for storing measurements limits the number of software contexts that can be measured separately and stored in the TPM. Similarly, its simple I/O interface prevents it from handling more than one session at a time (one session is a set of I/O transactions transferring the data and commands necessary to complete a specific security function). These limits on the TPM's scalability have been addressed by the development of a virtualized TPM, able to spawn multiple virtual, software TPMs. The credentials of the hardware TPM are used to vouch for the software TPMs. A Virtual Machine Manager (VMM) running on the platform's processor hosts TPM virtualization logic which gives each Virtual Machine (VM) hosted by the VMM the illusion that they have access to their own TPM. While the virtual TPM allows each software context (i.e., each VM-based software stack) to have access to TPM services independently, it cannot provide these services to software contexts smaller than a VM (e.g., to a software library running within the VM). Each context must contain its own software stack, including an operating system sophisticated enough to host a virtual TPM driver. This limits the number of different contexts that can be handled by a virtualized TPM on a given machine, since each context requires allocating memory and CPU resources for a software stack.

The TPM approach is better suited for platforms hosting a simple operating system, since this is more easily inspected for correctness, and tested for security vulnerabilities. Once it is determined to be trustworthy, its identity can be bound to an initial set of critical data (e.g., cryptographic keys) using TPM's sealed storage. Before providing such an OS with more critical data, a remote party requests a TPM attestation report and simply checks that the OS identity has not changed. However, most PCs today run large, complex, extendible and frequently updated commodity operating systems. Inspecting such an OS for correctness is a very daunting task, as evidenced by the large number of exploitable vulnerabilities found in mainstream operating systems, even long after their release. This means it is practically impossible to determine with certainty that a given commodity OS is trustworthy. TPM-based systems can seal security-critical data to this operating system's identity, but there are no guarantees that the OS will not be hijacked and leak or corrupt the data.

Even if a trustworthy version of the OS is found, its identity would be subject to constant change over time, due to updates, extensions (e.g., a new device driver) and modifications to its configuration data (e.g., new values in the Microsoft Windows registry). It is thus very unlikely that a fixed set of measurements can be found to seal a "trusted" commodity OS to a piece of security-critical data with the TPM. Without such a fixed set, TPM-sealed data must be migrated a priori from one configuration to the next every time a single bit of OS code or data changes.

As a result of its design goal for a low cost chip, the TPM has little computational power and a slow interface to the LPC (Low Pin Count) bus of a processor to which it is interfaced. Each security operation with the TPM requires a sequence of command and data transactions to be transferred via this slow bus, and many operations require the TPM chip to carry out public or private key operations with its limited resources. This leads to very high overheads for TPM security operations, reported to be in the hundreds of milliseconds, an eternity when compared to modern high-throughput general-purpose processors. There is thus clearly a significant performance advantage to be gained from moving trusted computing operations from a low-resource chip to the high-perfoimance processor chip. Not only the CPU has a much greater computational power, it also has direct access to memory data that it may need to decrypt, encrypt, hash, sign or otherwise process as part of trusted computing operations.

SUMMARY OF THE INVENTION

The present invention provides a system and method for processor-based security. In one embodiment, the present invention provides a system for providing processor-based security which includes a processor having a processor core, a cache memory, a plurality of registers for storing at least one hash value and at least one encryption key, a memory interface, and at least one on-chip instruction for creating a secure memory area in a memory external to the processor; and a hypervisor program executed by the processor, the hypervisor program instructing the processor to execute the at least one on-chip instruction to create a secure memory area for a software module, the processor encrypting data written to, and decrypting data read from, the external memory using the at least one encryption key and the verifying data read from the external memory using the at least one hash value.

In another embodiment, the present invention provides a system for providing processor-based security which includes a processor having a processor core, a cache memory, a plurality of registers for storing at least one hash value, and a memory interface; and at least one on-chip instruction for performing a secure launch of a hypervisor program, the instruction causing the processor to: compute a first hash value over a current state of the hypervisor program; compare the first hash value to a second hash value stored in the plurality of registers; if the first hash value matches the second hash value, allocate a secure storage area in a non-volatile memory external to the processor for use by the hypervisor program; and if the first hash value does not match the second hash value, preventing access to the secure storage area.

In another embodiment, the present invention provides a system for providing processor-based security, which includes a processor having a processor core, a cache memory, a plurality of registers for storing at least one encryption key and at least one hash value, and a memory interface; and a hypervisor program executed by the microprocessor, the hypervisor program pre-programmed to: receive a request for an attestation report from a program executing external to the processor; determine the current state of each of a plurality of trusted software modules executing on the processor; construct a tailored attestation report including status information corresponding only to the plurality of trusted software modules; encrypt and sign the attestation report using the at least one encryption key and the at least one hash value; and transmit the tailored attestation report to the external program.

In another embodiment, the present invention provides a method for providing processor-based security, which includes the steps of: parsing a security segment data structure associated with a software module to determine security requirements for the software module; instructing a processor to execute at least one on-chip instruction to create a secure memory area in a memory external to the processor for use by the software module; assigning the software module to the secure memory area so that the software module can execute using the secure memory area; encrypting data written to, and decrypting data read from, the secure memory area using at least one encryption key stored in a plurality of registers in the processor; and verifying data read from the secure memory area using at least one hash value stored in the plurality of registers in the processor.

In another embodiment, the present invention provides a method for providing processor-based security, which includes the steps of computing in a processor at least one hash value using a current state of a hypervisor program executed by the processor; comparing the at least one hash value to a second hash value stored in one of a plurality of registers of the processor; if the at least one hash value matches the second hash value, allocating a secure storage area in a memory external to the processor for use by the hypervisor program, and if the at least one hash value does not match the second hash value, block the hypervisor program from accessing the secure storage area.

In another embodiment, the present invention provides a method for providing processor-based security which includes the steps of: receiving at a computer system a request for an attestation report from a program executing external to the computer system; determining the current state of a plurality of trusted software module executing on a processor of the computer system; constructing a tailored attestation report including status information corresponding only to the plurality of trusted software modules executing on the processor; encrypting and signing the attestation report using at least one encryption key and at least one hash value stored in the processor; and transmitting the tailored attestation report to the program.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for processor-based security, as discussed in detail below in connection with FIGS. 1-13.

Figure 1:
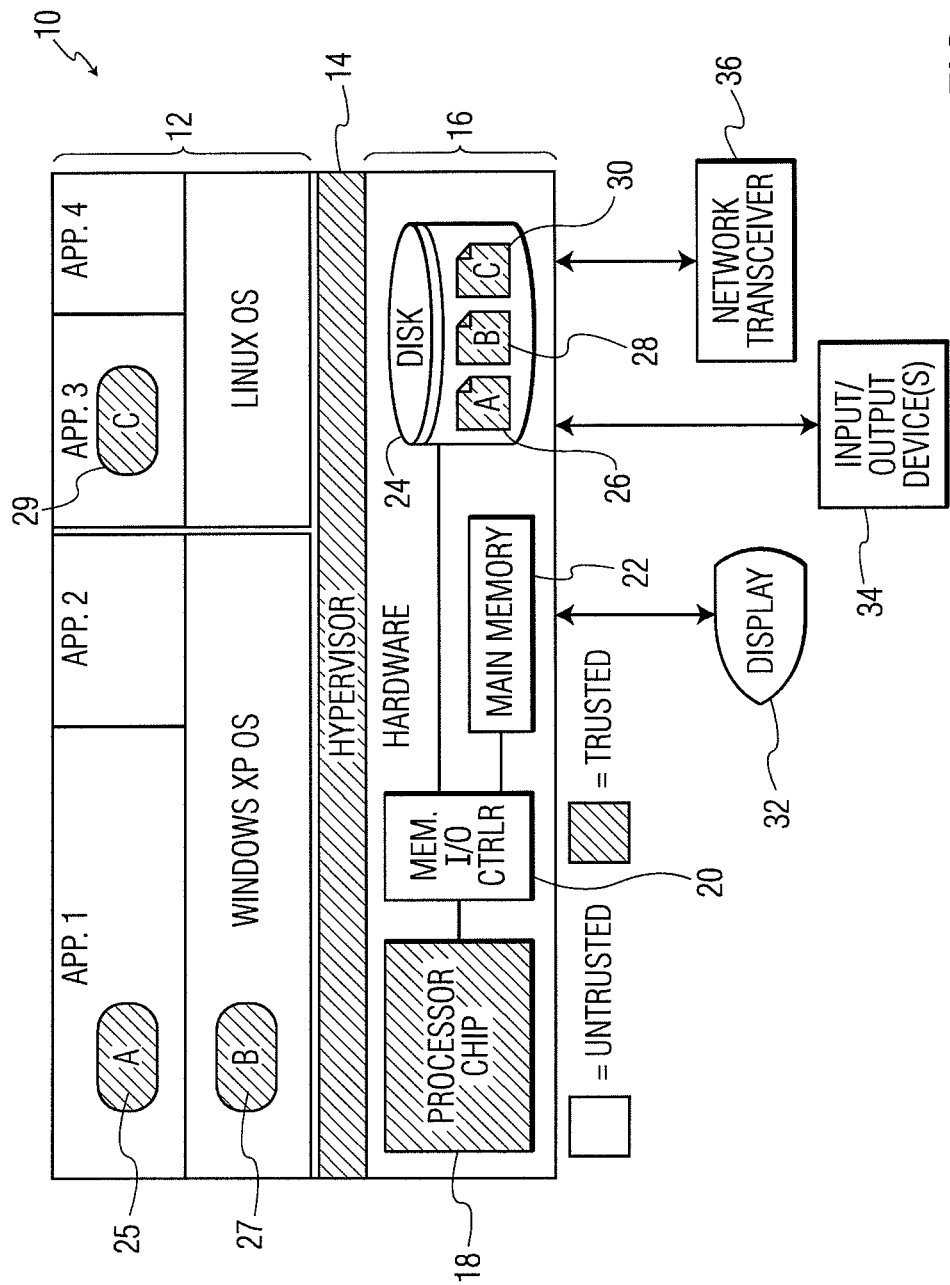
FIG. 1 is a diagram shown the processor-based security system of the present invention implemented in a computer system.

FIG. 1 is a diagram showing a computer system 10 in which the processor-based security system of the present invention can be implemented. The system 10 includes a plurality of software applications and associated operating systems 12, a hypervisor 14, and computer hardware 16. The computer hardware 16 includes a processor chip 18 (which could include any desired single- or multi-core processor), a memory input/output (I/O) controller 20, a main memory 22 (which could include dynamic, random access memory (DRAM)), and a disk subsystem 24. Stored on the disk subsystem 24 are secured storage areas 26, 28, and 30 which correspond to trusted application (software) modules A, B, and C shown in FIG. 1. Also provided is a display system 32, one or more input/output devices 34 (e.g., keyboard, mouse, etc.), and a network transceiver 36 (e.g., Ethernet transceiver, modem, etc.).

As discussed in greater detail below, the hypervisor 14 and the chip 18 of the present invention provide a processor-based system for providing security for software applications executing on the computer system 10, without the need for a separate, off-chip security device or a separate security program. The hypervisor 14 is a software program that is executed by the processor 18. The hypervisor 14 and the chip 18 provide a trusted computing base which allows for on-chip security and trusted software features such as sealed storage and attestation, which, in the past, required a separate chip external to the chip 18 to execute such functions. Together, the hypervisor 14 and the chip 18 provide secure launching of trusted software modules by the system 10, a secure execution environment for executing these trusted software modules, including on-chip computation resources and memory areas for executing these modules, secure off-chip volatile memory storage, secure off-chip non-volatile pervasive storage (e.g., disks) as well as secure inter-communication between the modules. Examples of a module are a subroutine and its private data space, a library of functions, a class in an object-oriented programming language, a plug-in application extension, or a loadable software module. As discussed below, the present invention can work with computer platforms which support multiple operating systems executing on a single processor.

As can be seen in FIG. 1, the application modules A, B, C (labeled by reference numerals 25, 27, and 29) can run on or within commodity operating systems, such as Microsoft Windows XP, Linux, etc. Each module is associated with its own secure storage area 26, 28, and 30 on the untrusted disk 24. It is assumed that the processor 18 has virtualization support, meaning that it has at least three hierarchical privilege levels, or protection rings. In addition to the usual user privilege level (PL)=3) and supervisor (PL=0) privilege levels, the hardware 16 also provides new hypervisor or Virtual Machine Monitor (VMM) privilege level(s). The hardware 16 ensures that software at other privilege levels cannot access code or data at the hypervisor privilege level (sometimes called ring −1). The hypervisor 14 gives the VMs the illusion they each have unrestricted access to all hardware resources, while retaining ultimate control on how the resources are used. The platform supports virtualized software stacks, where "guest" operating systems run in separate VMs, all monitored by the hypervisor 14. As used herein, the term "machine memory space" denotes the actual physical memory 22 available in the hardware 16. The hypervisor 14 virtualizes the machine memory space to create guest physical memory spaces for the guest operating systems it hosts.

When an OS builds a page table for an application, it maps virtual pages to page frames in its guest physical memory space. To map guest virtual memory to machine memory, the hypervisor 14 can use shadow page tables or nested paging, the two main techniques for memory virtualization. In the former, the hypervisor 14 maintains for each application a shadow page table translating virtual addresses to machine addresses. In the latter, the hypervisor 14 only keeps track of guest physical-to-machine memory translations in nested page tables. Virtual-to-machine address translations are provided to the processor on Translation Lookaside Buffer (TLB) misses, either by a hardware page table walker or by the hypervisor 14 itself. On a miss, shadow page tables already contain up-to-date versions of these translations. Nested page tables must be looked up in parallel with guest page tables to construct the missing translation on-the-fly. In both approaches, the hypervisor 14, not the guest OS, retains ultimate control on translations inserted in the TLB. It is also assumed that there are two levels of on-chip cache, as is the case in many general purpose processors. More than two levels of on-chip caches can be supported by the present invention. As used herein, L1 refers to cache memory closest to the processor, and L2 refers to refer to the last level of on-chip cache.

Figure 2:
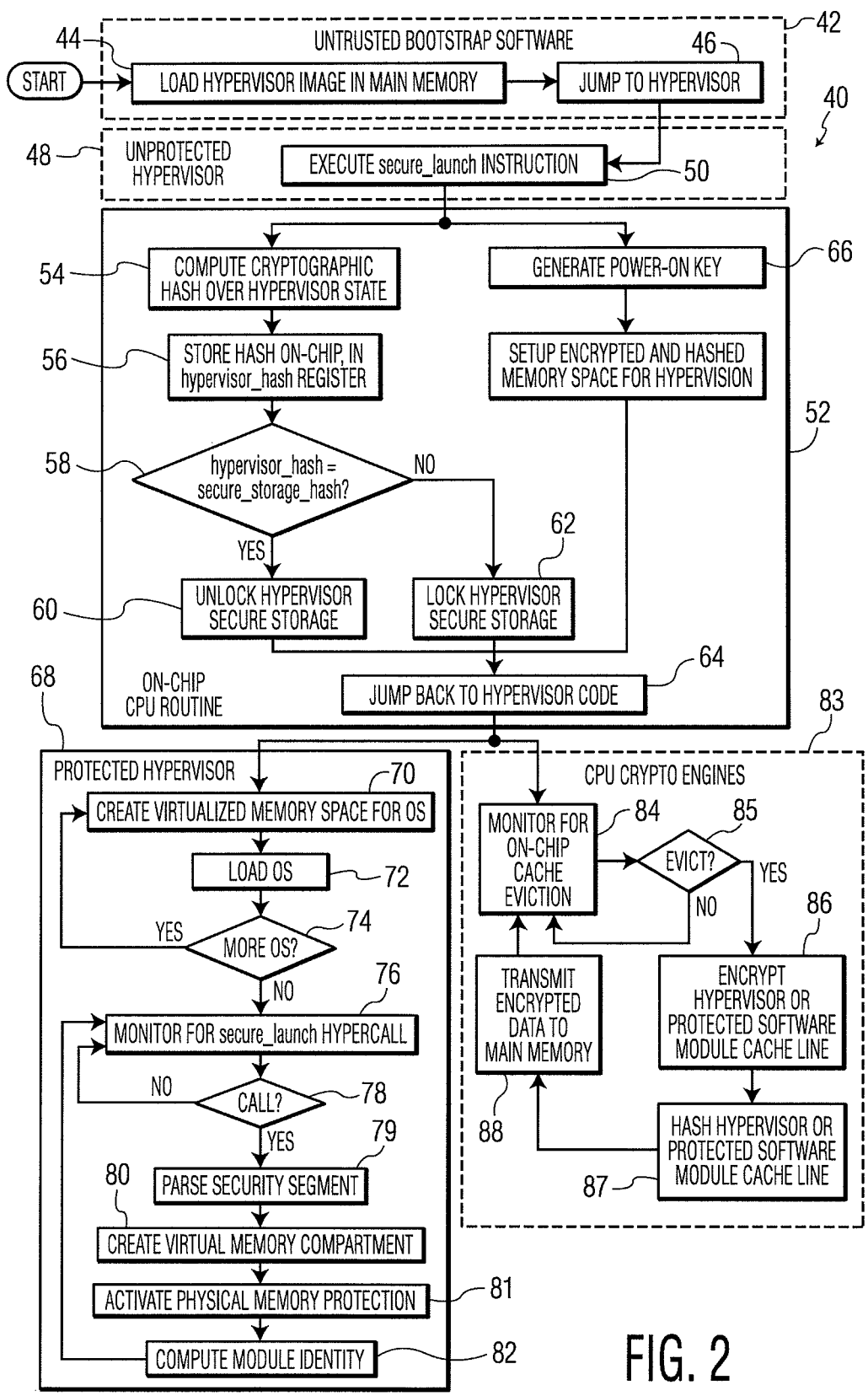
FIG. 2 is a flowchart showing processing steps carried out by the present invention to provide security services for software applications executed on a processor.

FIG. 2 is a flowchart showing processing steps according to the present invention, indicated generally at 40. In the process block 42 shown in FIG. 2, the preset invention loads an untrusted bootstrap loader software module and executes same. This involves, in step 44, loading a hypervisor image stored in non-volatile memory (e.g., a disk or a piece of Programmable Read-Only Memory, PROM) into the volatile main memory 22. Then, in step 46, control is passed to the hypervisor image. In block 48, an unprotected hypervisor starts executing on the processor, until in step 50, the secure_launch instruction of the present invention is executed to create a secure volatile memory area for the execution of the hypervisor, and to determine whether the hypervisor loaded into main memory should be given access to the secure disk area currently protected by the processor chip 18.

Processing steps of the secure_launch instruction are shown in block 52. In step 54, a cryptographic hash is taken over the current hypervisor state. Then, in step 56, the hash is stored in an on-chip register of the processor of the present invention, the "hypervisor_hash" register. In step 58, the value stored in the hypervisor_hash register is compared to a second hash value stored in another register of the processor referred to as the "secure_storage_hash" register. This register stores a hash value which corresponds to the identity of a hypervisor that created the secure storage area currently protected by the processor chip. By making this comparison, the present invention can determine whether a given hypervisor loaded into main memory should be given access to the said secure storage area. If a positive determination is made in step 58, step 60 occurs, wherein the hypervisor is given access to the two processor registers (discussed below in greater detail) containing the cryptographic hash and cryptographic encryption key protecting the hypervisor's secure storage area on disk, thereby unlocking this area for the hypervisor. Otherwise, step 62 occurs, wherein the two registers are locked, thereby precluding the hypervisor from accessing the secure storage area on the disk. Then, step 64 occurs, wherein control jumps back to the hypervisor's code. Also, in step 66 a power-on key value is generated, and in step 67, an encrypted and hashed memory space is set up for the hypervisor. The power-on key value secures the hypervisor data and code in main memory in the event of a power-down or re-boot.

After processing in block 52 is complete, processing in blocks 68 and 83 occur. In block 68, the hypervisor executes in a protected memory area, with a secure storage area if the hypervisor has access to such a secure resource. In step 70, a virtualized memory space is created for an operating system. Then, in step 72, the operating system is loaded into the virtualized memory space. In step 74, a determination is made as to whether any additional virtualized memory spaces should be created and operating systems loaded therein. If so, control returns to step 70. Otherwise, step 76 occurs, wherein the protected hypervisor monitors for a secure_launch hypercall. The secure_launch hypercall is a programming construct which allows a programmer to request that the present invention provide secure memory and/or disk areas for a software module forming part of a larger software system, either an application or an operating system. In step 78, a determination is made as to whether the secure_launch hypercall has been invoked. If not, step 76 is repeated; otherwise, step 79 occurs.

In step 79, the present invention parses a security segment (discussed below in greater detail) associated with a software module for which the secure_launch hypercall has been called. Processing steps of the secure_launch hypercall are described now in connection with steps 79-82. In step 80, the present invention creates a secure virtual memory compartment in main memory for the software module. In step 81, the present invention activates physical memory protection for the software module. As discussed in greater detail below, this involves on-chip encryption of data before it is written to the software module's memory area, as well as on-chip decryption of encrypted data in the module's memory area so that the processor can process the data. In step 82, the hypervisor computes a module identity value.

In block 83, the present invention also uses on-chip (CPU) cryptography engines to encrypt information for software modules and/or hypervisors that have requested (by way of the secure_launch hypercall or instruction) secure memory areas in which to execute. The functionality of these engines is now described in connection with steps 84-88. In step 84, the crypto engines monitor for an on-chip cache memory eviction event. In step 85, a determination is made as to whether an eviction event has occurred. If no event has occurred, step 84 is repeated. Otherwise, step 86 occurs, wherein either a cache line of the hypervisor of the present invention or a cache line of a protected software module are encrypted. In step 87, the present invention applies a hash function to the hypervisor to update the memory integrity tree discussed in greater detail below in connection with FIG. 6, or the hash function is applied to the software module's cache line, to update the same memory integrity tree. In step 88, the encrypted data is transmitted to main memory, where it is stored.

It is noted that, if an untrusted loader skips secure_launch or loads a corrupted hypervisor, the hypervisor_hash value will be different, or will not get computed at all. In such circumstances, the hypervisor's secure storage area then remains locked, since it is tied to the good hypervisor_hash value. This ensures that no other software can read or modify the information in the hypervisor's secure storage. Additionally, it is noted that information provided to the processor of the present invention is first decrypted if a corresponding cache line is marked as "secure," and the branch of the memory integrity tree is validated to check that what is retrieved from memory is exactly what was legitimately written.

As can be seen from FIG. 2 discussed above, once the hypervisor 14 of the present invention is up and running within its protected memory space, it can spawn any number of Virtual Machines (VMs). For each VM, it allocates a chunk of memory and other resources. It copies or maps boot code (e.g., OpenBoot or BIOS code) into the partition's memory space and then jumps to that boot code. The boot code initializes the VM and eventually loads an operating system, which in turn loads any number of applications. At any point during runtime, a security-critical OS or application module may invoke a new secure_launch hypercall to request a secure execution compartment from the hypervisor 14.

A module's secure_launch hypercall has an argument pointing to a new security segment data structure, discussed in greater detail below in connection with FIG. 5. This defines the module's private code and data pages, authorized entry points and authorized shared memory interfaces. The hypervisor's secure_launch routine parses this definition to set up a Shadow Access Control mechanism, which creates a memory compartment for the module's memory pages and enforces strict separation of this compartment from the rest of the software stack during runtime. The secure_launch hypercall also activates runtime memory protection for all module pages and computes the module identity, which is a hash of the module's initial state and its security segment.

Figure 3:
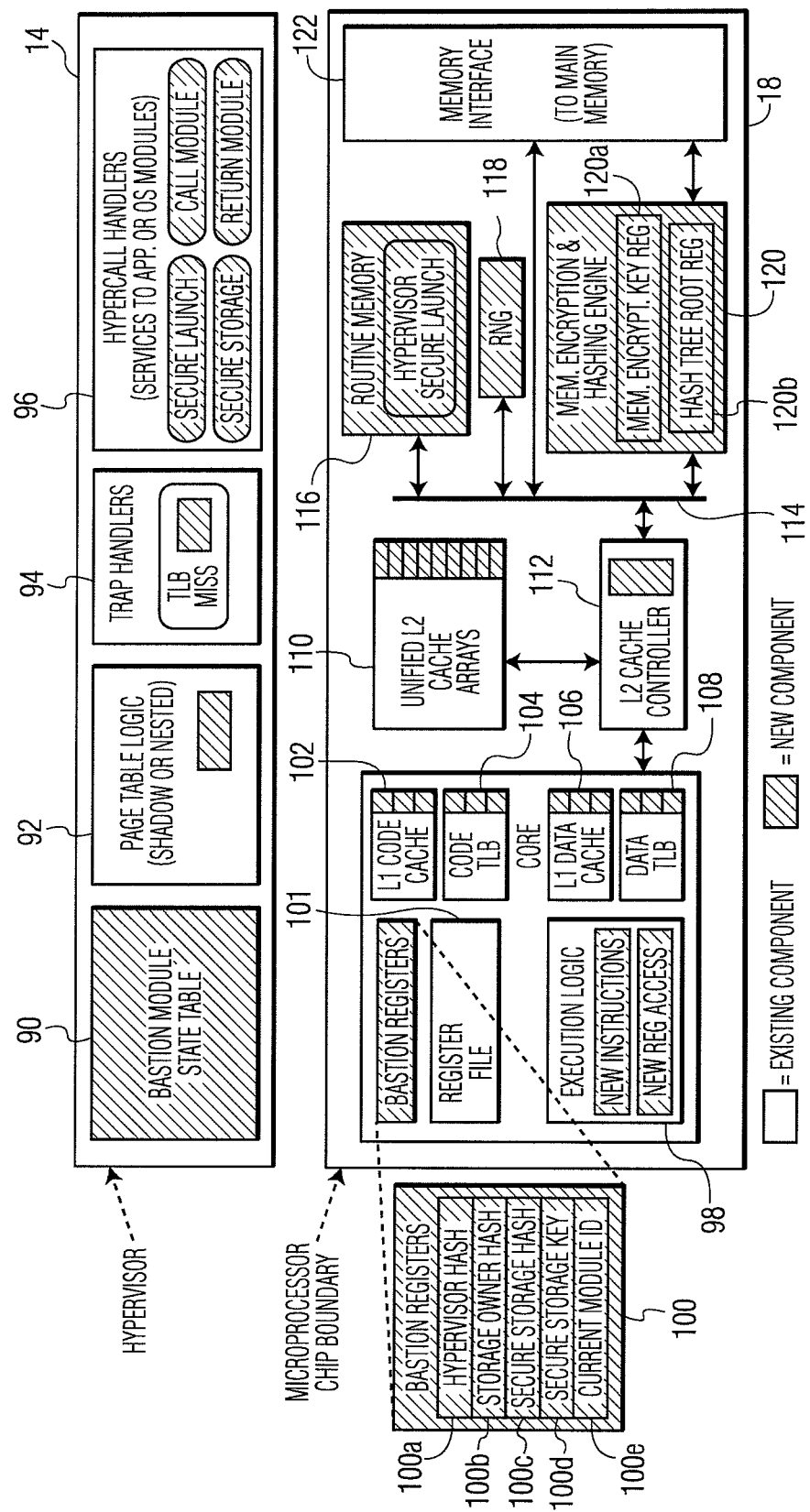
FIG. 3 is a diagram showing the processor and hypervisor of FIG. 1 in greater detail.

FIG. 3 is a diagram showing the processor 18 and hypervisor 14 of FIG. 1 in greater detail. Elements in FIG. 4 that are shaded grey represent components of the present invention that are added to a conventional processor and hypervisor. The hypervisor 14 includes a module state table 90, page table logic 92 (which can be nested page table or shadow page table logic), trap handlers 94, and a plurality of hypervisor handlers 96. The processor 18 includes a plurality of registers 100 (including registers 100a-100e), a register file 101, execution logic 98 (which includes the new instructions and register access logic of the present invention), a level 1 (L1) code cache 102, a code cache translation look-aside buffer (TLB) 104, an L1 data cache 106, a data TLB 108, unified level 2 (L2) cache arrays 110, an L2 cache controller 112, a bus 114, a routine memory 116 (which includes a hypervisor secure launch procedure and a hypervisor attestation routine), a random number generator (RNG) 118, a memory encryption and hashing engine 120 (which includes encryption key register 120a and hash tree root register 120b), and a memory interface 122 which interfaces the processor 18 with main memory 22 of FIG. 1.

Table 1, below, shows the structure of the module state table 90:

TABLE 1

| module_id | launch-time identity | runtime corruption? | saved register state |
|---|---|---|---|
| $id_1$ | identity($id_1$) | yes/no | register_state($id_1$) |
| $id_2$ | identity($id_2$) | yes/no | register_state($id_2$) |
| $id_3$ | identity($id_3$) | yes/no | register_state($id_3$) |
| . | . | . | . |
| . | . | . | . |
| . | . | . | . |
| $id_x$ | identity($id_x$) | yes/no | register_state($id_x$) |

During a secure_launch hypercall procedure for launching a trusted software module, the hypervisor 14 writes the computed module identity in the table 90, along with the module_id of the module being launched. During runtime, the bit indicating runtime corruption, initially set to '0', is set to '1' if the integrity checking engine detects corruption in one of the module's pages. When a module is preempted, the hypervisor's secure module transition mechanisms (discussed herein below) store the module's register state in the dedicated table entry. During tailored attestation (also discussed below), the hypervisor looks up the table entry of every module it reports, to read its identity and determine whether it has been corrupted since launch.

Figure 4:
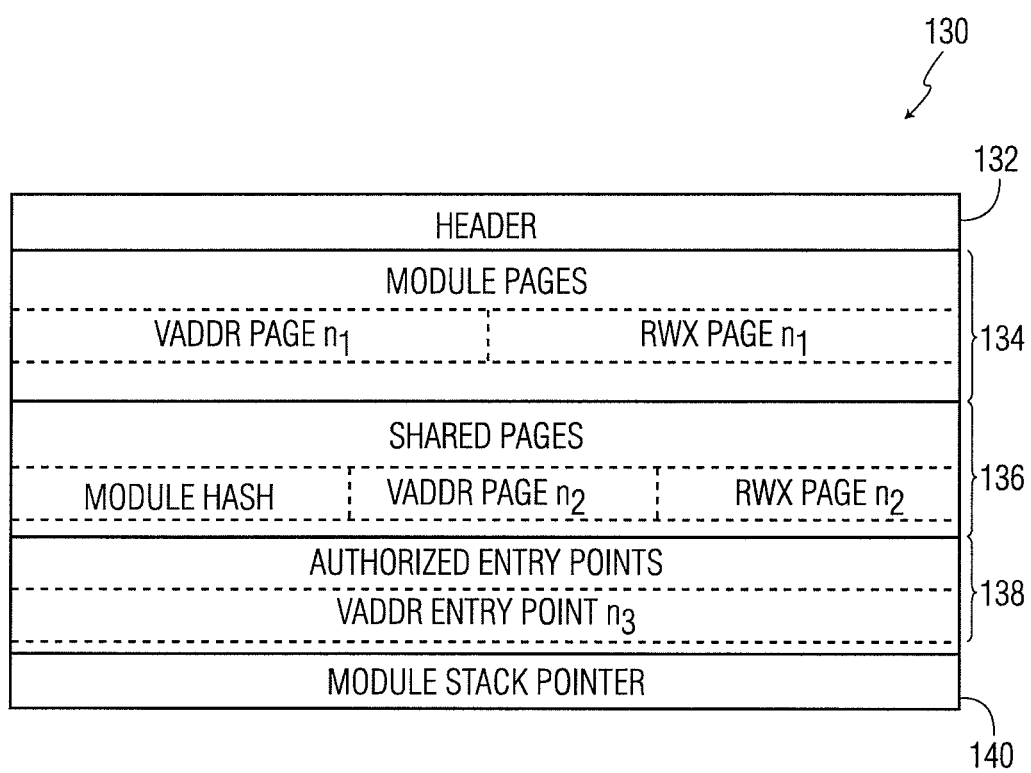
FIG. 4 is a diagram showing a security segment data structure in accordance with the present invention.

Reference is now made together to FIG. 3 and FIG. 4, which is a block diagram showing the security segment of the present invention, indicated at 130, in greater detail. Each trusted software module 25, 27 or 29, executed by the processor 18 has its own security segment 130. This must be made available to the calling software module before it invokes a secure_launch hypercall. It can be compiled into the data space of the application or OS containing the module, or it can be read from a separate data file. Its internal structure is fixed and known to the hypervisor 14, and includes a header 132, a module pages section 134, a shared pages section 136, an authorized entry points section 138, and a module stack pointer 140. The module definition contained in the security segment is derived from instructions given by the programmer, e.g., via code annotations. The main part of this definition is a set of Shadow Access Control rules, each formed by the following triple: 1) a module hash identifying a module, computed over the module's initial code and data; 2) the virtual address of a page associated with the identified module; and 3) the Read/Write/eXecute (RWX) access rights given to this module for that page. The module pages section 134 describes the pages belonging specifically to the module being defined in this security segment. The Shadow Access Control rules it lists thus have an implicit module hash. Shared memory interfaces are defined in the shared pages section 136 of the segment, where Shadow Access Control rules identify sharing modules explicitly. The authorized entry points section 138 lists the virtual addresses of authorized entry points into module code. The module stack pointer 140 specifies the top of the module's private stack. Memory for this stack is reserved within the pages listed in the module pages section 134.

As discussed above, the secure_launch hypercall parses a security segment to extract Shadow Access Control rules and then checks their compatibility with rules requested by modules processed in previous invocations of secure_launch. The hypervisor 14 checks that: 1) there is no aliasing between modules' private virtual pages, nor between the corresponding machine pages; and 2) all modules sharing a memory page agree on one another's identity. Validated rules are written to the shadow page table, discussed in greater detail below in connection with FIG. 5, containing the module. To speed up verification of aliasing between machine pages, the hypervisor also maintains a data structure mapping each machine page to the set of modules allowed access to the page. These mappings are also updated as validated rules are committed to the shadow page tables. Within these data structures, the hypervisor 14 identifies modules using their module_id, a shorthand for their full identity hash. The module_id is a unique identifier assigned to each module by secure_launch and valid until the next platform reset. It is used in hypervisor 14 software and in hardware tags, so its bit width must be much smaller than that of a full hash (which is typically 128 or 160 bits, but could vary), but also large enough to accommodate a large number of concurrent modules. Between 8 and 20 bits has been found to be sufficient, but other values are possible.

The present invention supports arbitrary module sizes, defined at page granularity. For example, a module could be composed of the few pages containing the code and private data of a security-critical function, or the code and data space of a library, or an OS loadable module, or an entire trusted application or even the whole memory space of a trusted OS. Ideally, a module should encapsulate only the code and data necessary to fulfill its security objectives, making it small and easy to verify for correctness, possibly using formal methods. However, it may not always be possible to perform such fine-grain partitioning of an application or OS, especially in legacy software. As such, the present invention also supports large modules to provide monolithic pieces of software with physical attack protection and secure storage.

At runtime, the compartments defined by Shadow Access Control rules are enforced by the processor hardware 16 of FIG. 1. Rules are available in the instruction and data TLBs of FIG. 3 and enforcement is done during the TLB lookup preceding every memory access. Violations are signaled by a new type of TLB miss causing the hypervisor 14 to intervene. To express Shadow Access Control rules, TLB entries are extended with a module_id tag identifying a module allowed access to the page. To enable enforcement, a new current_module_id register (one of the registers 100, i.e., register 100e, discussed below) specifies the module_id of the module currently executing. Memory accesses are allowed to go forward only if the TLB module_id of the page accessed is equal to the one in current_module_id. All software that is not in a compartment is considered part of a generic module zero, with pages tagged using the reserved module_id 0. Therefore, modules (including the untrusted module zero) can only access instructions and data tagged with their module_id.

The method for getting the right module_id to a TLB entry on a TLB miss is hypervisor-specific: it depends on the technique used for virtualizing machine memory. When shadow page tables are used, the hypervisor extends shadow page table entries with the module_id. The transfer of a shadow page table entry from hypervisor memory to the TLB thus automatically transfers the module_id. To handle shared virtual pages, the hypervisor must replicate shadow page table entries for these pages and assign each entry the module_id of a module sharing the page. The hypervisor checks that replicated entries map to the same machine page to ensure the correctness of this form of aliasing. Hardware pagetable-walkers, if used, must be modified to handle shared virtual pages.

Figure 5:
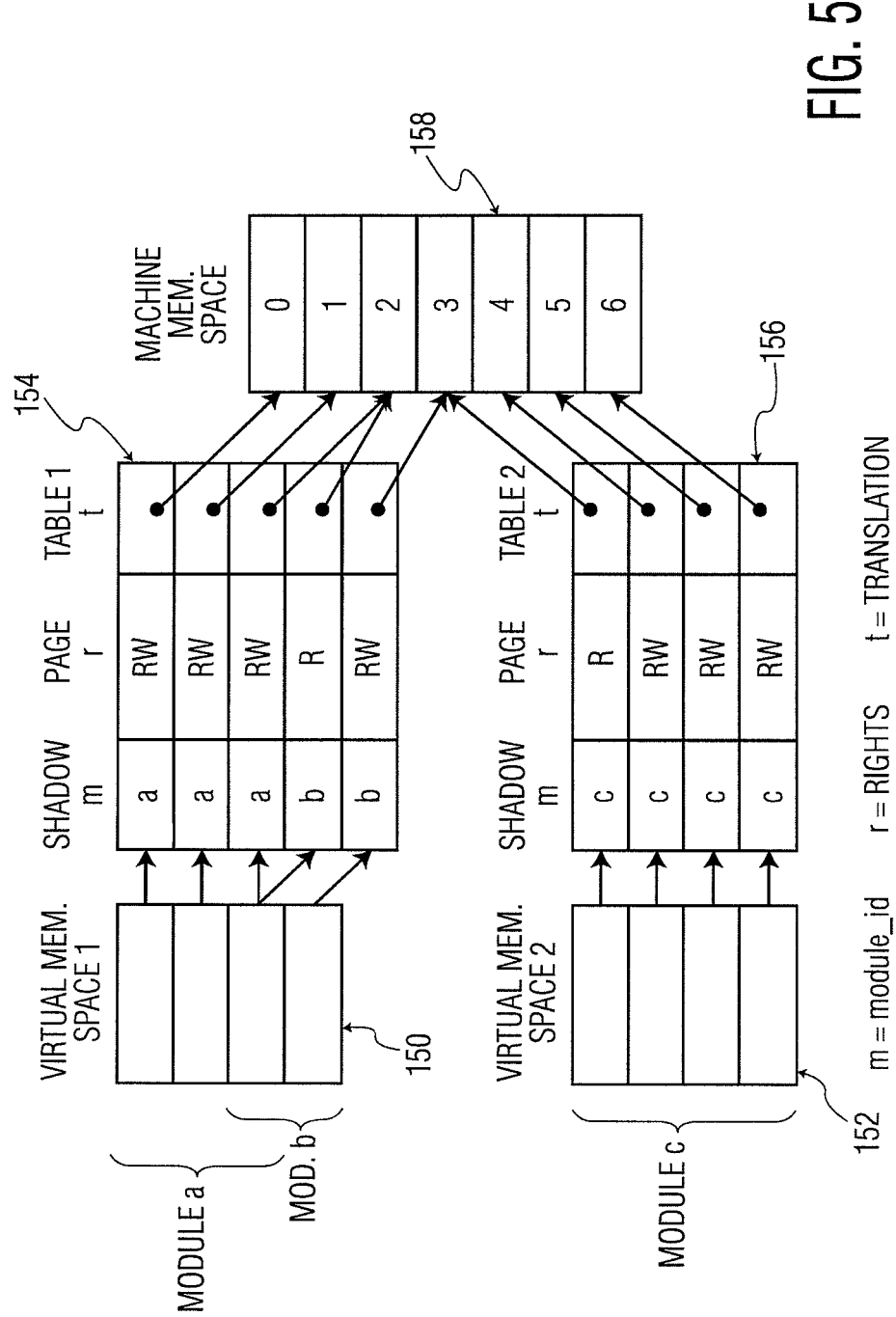
FIG. 5 is a diagram showing the extended shadow page table mechanism provided by the present invention.

FIG. 5 is a diagram showing shared memory accessing achieved by the present invention. Memory sharing is shown in FIG. 5 across first and second virtual memory spaces 150 and 152, first and second shadow page tables 154 and 156, and machine memory space 158. Modules a and b share machine page 2 within virtual address space 1 and modules b and c share machine page 3 across virtual address spaces 1 and 2. FIG. 5 also shows each module's entry may have different access rights, e.g., a producer-consumer buffer between the two modules.

Hypervisors using nested paging rather than shadow page tables only track guest-physical-to-machine memory mappings; they do not maintain copies of all virtual-to-machine memory mappings as is done in shadow page tables. In this case, missing TLB entries—the virtual-to-machine address translations with access rights—must be constructed on-the-fly by the hypervisor 14 or a hardware nested page table walker instead of simply fetched from a shadow page table. To add the module_id to these TLB entries, an extra step is added to the TLB miss handling procedure: once the entry is constructed, the hypervisor 14 checks that the entry respects the rules in the Module State Table 90, adds the appropriate module_id and writes the extended entry to the TLB. When a hardware nested page table walker is used, a new hypervisor trap is triggered at the end of a table walk. Hypervisor software then inspects and extends the new TLB entry. When the hypervisor determines a memory access request violates Shadow Access Control rules, it either restricts or denies the request, depending on the requestor. A guest OS is given restricted access: it is given access to an encrypted and tamper-evident version of the cache line. An application is simply denied access. Restricted access is given to guest operating systems to ensure they can perform paging or relocate pages in physical memory. Encryption and tamper-evidence is provided by the Secure Physical Memory mechanisms described next.

The present invention protects hypervisor and module memory state against hardware adversaries that might snoop on or corrupt data on buses and memory chips. Such memory confidentiality and integrity is provided by two new hardware cryptographic engines 120 of FIG. 3, located between the L2 cache and main memory. One engine encrypts and decrypts protected cache lines while the other verifies their integrity using a hash tree. Using the on-chip RNG 118 of FIG. 3, the memory encryption key is generated anew by the on-chip secure_launch routine upon every platform reset to thwart (known ciphertext) attacks that could leak information across reboots if the same key was reused.

The integrity hash tree of the present invention detects memory corruption attacks by checking that what is read from main memory at a given address is what the processor last wrote at that address. This is based on the Merkle tree technique which recursively computes cryptographic hashes on the protected memory blocks until a single hash of the entire memory space, the tree root, is obtained. The tree root is kept on-chip in the processor, while the rest of the tree can be stored off-chip. Authenticating a block read from main memory requires fetching and verifying the integrity of all hashes on the tree branch starting at the block of interest and ending with the root. Similarly, a legitimate update to a block triggers updates to hashes on the block's branch, including the root. Tree nodes can be cached to speed up tree operations and the simple hashing primitive can be substituted for one with better performance characteristics.

During platform boot-up, the on-chip secure_launch routine initializes the tree to fingerprint the loaded hypervisor. Two new L2 cache tag bits (i_bit and c_bit) identify cache lines requiring encryption or hashing. The values of these bits come from the TLB, where each entry is also extended with an i_bit and a c_bit. The present invention's runtime memory protection mechanisms operate at a page granularity: all L2 cache lines in a page are tagged with the i_bit and c_bit read from that page's TLB entry. The bits in this entry are set by the hypervisor 14 on a TLB miss. To protect trusted module memory, the secure_launch hypercall encrypts the pages of each module being launched, and adds its pages to the tree's coverage. During runtime, the hypervisor sets the TLB i_bit and c_bit for module pages. The tree also protects module pages swapped from memory to an on-disk page file and back.

The present invention's hash tree is slightly different from traditional Merkle hash trees. It selectively covers only hypervisor and trusted module pages, while it covers the entire physical memory space. It covers pages swapped out to disk, while it does not cover data outside the physical memory space.

Figure 6:
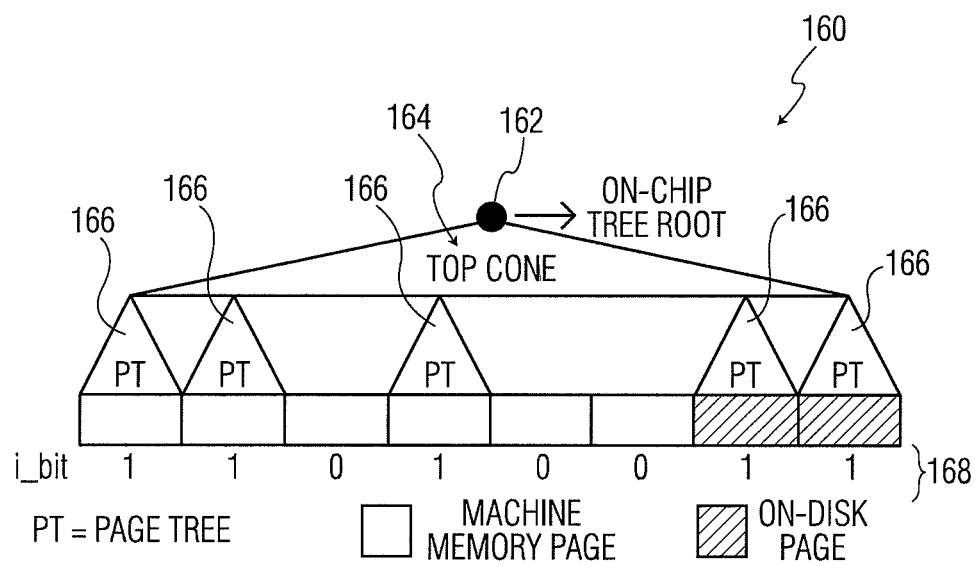
FIG. 6 is a diagram showing a memory integrity tree generated and maintained by the present invention for verifying the integrity of memory and disk pages.

FIG. 6 is a diagram showing the integrity hash tree of the present invention, indicated generally at 160. The tree 160 includes an on-chip tree root 164. To efficiently support its functionality, the integrity tree is formed of two parts: a top cone 164 and several page trees 166. A page tree is a Merkle hash tree computed over a page of data or code, with a root called the page root. The top cone 162 is a Merkle hash tree rooted in a register of the hashing engine and computed over the page roots, to protect their integrity. Upon platform reset, there are no pages to protect so the top cone 164 is initialized on a set of null page roots. When a page is added to the tree, its page tree is computed and its page root replaces a null page root. Each page tree 166 includes an i_bit 168. For simplicity, it is assumed that the components of the tree 160 are stored in dedicated machine memory regions and that the initial top cone 164 covers enough null page roots to satisfy the memory needs of the software stack.

Through its monitoring of (shadow or nested) page table changes, the hypervisor 14 of the present invention can detect whether a guest OS is sending a page out to disk. If the remapping respects Shadow Access Control rules, the hypervisor 14 moves the page's tree so it becomes rooted by one of the page roots reserved for disk pages. As a result, the tree root fingerprints module pages in main memory 22 and on the disk 24. When the guest OS moves a page from the disk back to physical memory (or simply relocates a page in physical memory), the hypervisor 14 moves the page tree to reflect the page's new position. If the OS or a physical attacker corrupts the page while it resides on the disk 24, the integrity checking engine detects tampering as soon as the affected cache lines are accessed by the module. Therefore, critical module pages remain tamper-evident and confidential as they are moved by the guest OS between memory and disk.

Entering and leaving protected modules securely is essential for security-critical software. The present invention addresses this need for secure control flow with mechanisms enabling secure invocation and preemption of modules. VM software always starts executing in the unprotected module zero, where the bootstrap procedure takes place. The hypervisor 14 thus starts a VM with the current_module_id register set to zero. It remains set to zero until a protected software module is called via the new CALL_MODULE hypercall in accordance with the present invention. This hypercall takes as parameters the module hash of the callee and the virtual address of the desired entry point. The hypervisor services CALL_MODULE by first checking the validity of this entry point against the list of authorized entry points provided upon secure_launch for the callee. When the entry point is valid, the hypervisor 14 registers the desired transition in the Module State Table 90 and returns from the hypercall.

Fetching the first callee instruction triggers a TLB miss due to a module_id mismatch—the instruction is tagged with the callee's module_id while the current_module_id register still contains the caller's module_id. This TLB miss is handled by the hypervisor 14. It checks whether the transition that just occurred was legitimate and previously registered in the Module State Table 90. If so, it allows the transition by setting current_module_id to the callee's module_id. It also saves the address of the call site so that it can later enforce a correct return into caller's code. Execution of the callee module then resumes.

Callee modules can only return to their callers via the new RETURN_MODULE hypercall of the present invention. As for CALL_MODULE, this hypercall registers the requested transition, but it does not modify the value in the current_module_id register. This means that when the callee executes the return instruction to jump back to the caller's code, an instruction TLB miss occurs due to a module_id mismatch. The hypervisor 14 intervenes to first check that this transition was previously requested. It also checks that the return address into the caller's code corresponds to the instruction following the caller's call site, previously saved by the hypervisor 14. When all checks pass, the hypervisor 14 allows the return transition back into the caller by setting the current_module_id register to the caller's module_id.

When a protected module gets preempted by the guest OS (e.g. to service a timer or device interrupt), the hypervisor 14 first intervenes to save the module's register state in the Module State Table 90. It also wipes out any remaining register state so that malicious OS code is unable to observe or modify critical module state via its registers. When the OS resumes module execution, the hypervisor 14 intervenes again to restore the register state of the preempted module, including the program counter. Hypervisor 14 intervention upon module preemption or resumption is triggered by a module_id mismatch between module code and OS interrupt handler code.

Figure 7:
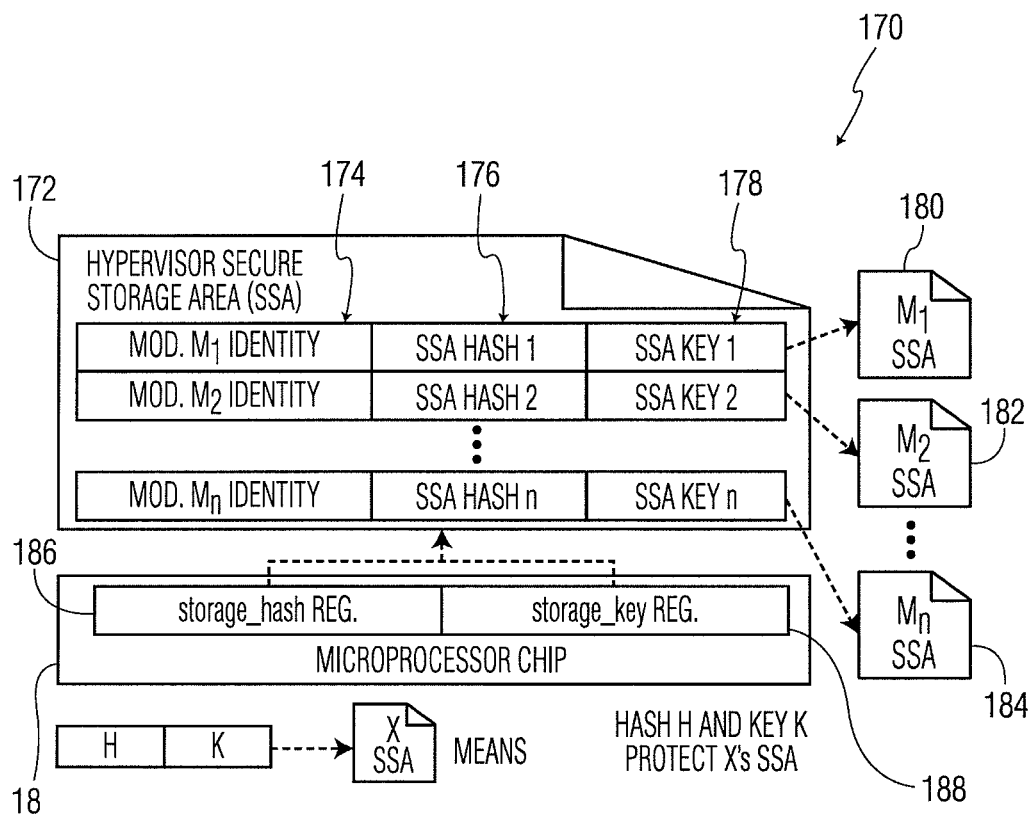
FIG. 7 is a diagram showing a secure storage area for the hypervisor of the present invention.

FIG. 7 is a block diagram showing a secure storage area 170 for the hypervisor 14 of the present invention. The secure storage area 170 includes a non-volatile memory 172, which could be, for example, a flash memory chip or disk, and which includes a plurality of module identity fields 174 and secure storage area hash keys 176 and 178, which access a plurality of module-specific secure storage areas 180, 182, and 184. The secure storage area 170 is where the hypervisor stores long-lived secrets and other persistent sensitive data. Its protection is rooted in registers 100 of FIG. 3. The hypervisor 14 protects its confidentiality and integrity by encrypting it with a symmetric encryption key and fingerprinting it with a cryptographic hash, both stored in dedicated processor registers 186 and 188 (which are the same as the secure_storage_key register 100*d* and secure_storage_hash register 100*c*). The values in these non-volatile registers exist across reboots and are only accessible to the hypervisor that created the storage area, identified by the hash value contained in the new non-volatile storage_owner_hash register 100*b*. When the values in storage_owner_hash 100*b* and hypervisor_hash 100*a* match, the secure_launch routine "unlocks" the existing secure storage area by giving the hypervisor 14 access to the secure_storage_hash and secure_storage_key registers 176 and 178 (which are the same as the secure_storage_hash register 100*c* and the secure_storage_key register 100*d*) The contents of these registers allow the loaded hypervisor to decrypt and hash verify the secure storage area it fetches from disk or flash, which may have been tampered with by a physical attacker since the last power down. When the values in storage_owner_hash and hypervisor_hash do not match, the secure_launch routine wipes out the contents of the secure_storage_hash and secure_storage_key registers before they become accessible to the loaded hypervisor. This prevents different hypervisors from accessing one another's secure storage areas and locks corrupted hypervisors out of a good hypervisor's secure storage.

Mechanisms for backup and migration of hypervisor secure storage can also be utilized to avoid loosing stored data upon deployment of a new hypervisor or following the load of a corrupted hypervisor. Trusted authorities can be used, from which the hypervisor can request migration and backup services. The hypervisor 14 can establish a secure communication channel to such an authority by authenticating the authority using a public key embedded in its data space.

The hypervisor 14 leverages its hardware-rooted secure storage to provide trusted software modules with their own secure storage in a scalable way. The secure storage area of a module is kept confidential with a symmetric encryption key and made tamper-evident with a cryptographic hash computed over its contents. The hypervisor 14 labels this (key, hash) pair with the identity of the module and stores the labeled pair in the hypervisor's secure storage area 170, protected by the dedicated hardware registers. This approach can scale up to an arbitrary number of module storage areas. Only two hardware registers (to protect the hypervisor's storage) are needed to protect any amount of data (for any number of trusted modules).

Modules access and manage their secure storage areas via new hypercalls. To create a new area, a protected module 1) generates a key; 2) encrypts the data to be stored in the area with the key; 3) computes a hash over the contents of the encrypted data; and 4) stores the encrypted data to disk or flash memory. Because it is encrypted and hashed, this data can safely exit the module's compartment to be written to disk via an untrusted file system manager using an untrusted disk device driver. To enable subsequent access to the data across platform reboots, the module invokes the WRITE_STOR- AGE_KEY and WRITE_STORAGE_HASH hypercalls with, respectively, the encryption key and the computed hash as arguments. These hypercalls bind the module's identity to the key and hash pair protecting the new storage area, and store the resulting (key, hash, identity) tuple in the hypervisor's secure storage area. To recover this key and hash following a platform reboot, the module invokes the READ_STORAGE_KEY and READ_STORAGE_HASH hypercalls. The hypervisor services these calls by returning the key and hash only if the identity of the invoking module (computed during a secure_launch invocation) is identical to the identity of the module that created the secure storage area. When a module modifies the contents of an existing area, it invokes the WRITE_STORAGE_HASH to commit the updated state to the hypervisor's secure storage. Modules can detect the malicious replay of an old version of their storage since the hypervisor always returns the hash reflecting the latest update.

The present invention was implemented by modifying the Sun Microsystems UltraSPARC T1 (codename Niagara) processor and the UltraSPARC hypervisor. The Verilog description of the processor and the source code of the hypervisor are both publicly available as part of the OpenSPARC project. OpenSPARC also provides developers with a full-system implementation, in a Xilinx Embedded Developer's Kit (EDK) project, of the T1 chip—i.e., the UltraSPARC core, crossbar, L2 cache (emulated by a Xilinx MicroBlaze processor running firmware), UART and on-chip Ethernet and memory controllers. This implementation can be synthesized for a Xilinx Virtex 5 Field-Programmable Gate Array (FPGA) and executed on the Xilinx ML505 development board. This board includes a Virtex 5 FPGA chip, a 256 MB DRAM DIMM, a Flash memory card controller, a Network Interface Card and other I/O peripherals.

As a proof-of-concept implementation, the single-thread UltraSPARC processor was modified with the hardware of the present invention, and the hypervisor was also modified in accordance with the present invention. The resulting FPGA board successfully hosted the hypervisor of the present invention, protecting trusted software modules in an application running on an unmodified commodity OpenSolaris operating system. All the functionality discussed herein was implemented either in hardware, firmware or software, except for the Random Number Generator, restricted OS access to protected pages and shadow page table logic (the hypervisor uses nested paging). The hypervisor and module attestation capabilities of the present invention were implemented. While the present invention was tested on the OpenSolaris platform, it can also be implemented on other platforms.

To add the new registers 100 of the present invention to the T1 processor, a top-level Verilog unit was created containing storage flip-flops and address decoders for 32 new 64-bit registers. These 2048 bits of register storage hold the hypervisor hash, the secure storage key, hash and owner hash, and a private attestation key. Instruction and data TLBs were extended with a 5 bit module_id in each entry and a 5-bit current_module_id register was added. The TLB lookup logic was also enhanced to raise a TLB miss on a mismatch between the module_id tagging a "matching" TLB entry and the value in the current_module_id register. Although the present invention was designed to support much more than 32 modules, 5 bits is a convenient width for this implementation since it corresponds to an unused part of existing TLB lines.

The internal processor routines (hypervisor secure launch and attestation) of the present invention were implemented as compiled SPARC code executing from a reserved range in machine address space. The routine code is responsible for identifying the hypervisor so it cannot rely on the hypervisor. It was developed as a self-contained software stack with a tiny, statically-linked C library as runtime support for the secure routines. To invoke an internal processor routine, the hypervisor simply jumps to its entry point within the reserved range of machine address space.

The cache-related mechanisms of the present invention were implemented in the MicroBlaze firmware, adding a hardware AES encryption-decryption engine as a Fast Simplex Link (FSL) MicroBlaze peripheral. Extended firmware checks whether the c_bit of each cache line accessed by the core is set and if so, sends the line to the hardware AES engine to be decrypted or encrypted on, respectively, a read from or write to external memory. Similarly, the firmware checks the i_bit and uses the AES engine as a CBC-MAC (Cipher Block Chaining—Message Authentication Code) hash function to perform integrity hash tree verifications or updates. Finally, the extended firmware detects and routes accesses to the machine memory range reserved for secure on-chip routines.

To add the present invention to the UltraSPARC hypervisor, the instruction and data TLB miss handlers were modified, and new hypercall handlers were added. To speed up implementation, many of the functions added to the hypervisor were coded in C rather than the SPARC assembly used throughout the existing hypervisor (except for initialization routines written in C). This required providing the hypervisor with its own stack and with routines to make enough register windows available to the C routines. Using C code during runtime in a thin hypervisor layer provided a proof-of-concept implementation that can boot a full commodity operating system and its applications in an acceptable amount of time.

The application modules of the present invention have their own private data and code space, and they share a single page as a memory interface. To support dynamic memory allocation, a set of pages is assigned to each module to be used as their private heaps and stacks. The hypervisor routines for secure module control flow are responsible for switching stacks upon entering or leaving a module. To support functions such as heap memory allocation, each module is assigned a separate copy of a statically-linked, minimalist C library.

TABLE 2

| SPARC CPU Core | Original System T1 core | Bastion Additions absolute (change) new regs, TLB tags, new instructions |
|---|---|---|
| Slice Registers | 19.6K | 1.6K (+8.2%) |
| Slice LUTs | 30.9K | 1.1K (+3.6%) |
| BRAMs | 98 | 0 (+0%) |
| Non-core HW | crossbar, L2 ctrlr, etc | AES crypto core, µBlaze interface |
| Slice Registers | 28.7K | 5.9K (+20.6%) |
| Slice LUTs | 39.5K | 6.5K (+16.5%) |
| BRAMs | 114 | 15 (+13.2%) |

TABLE 3

| | Original System | Bastion Additions absolute (change) |
|---|---|---|
| OpenSolaris OS | 9.06M | 0 (+0%) |
| Hypervisor | 38.1K | 2.9K (+7.6%) |
| Cache Firmware | 12.1K | 0.8K (+6.6%) |
| CPU Routine | 0 | 1.5K (N/A) |

Tables 2 and 3 above show, respectively, the hardware and software complexity of the present invention (referred to in the tables as the "Bastion" additions). Table 2 shows that modifications of the present invention to the processor core increase resource usage by less than 10%. Table 3 shows increases in the size of the hypervisor and firmware code base are between 6 and 8%. The new AES crypto core causes the biggest increase in resource consumption.

TABLE 4

| | Bastion Performance # of instructions executed | | Notes/Comparison |
|---|---|---|---|
| module SECURE_LAUNCH | 11,881 (40 kB module) | 13,781 (96 kB module) | Initializing SPARC VM: 468,537 instructions |
| module call/return | 1913 | 1902 | <0.1% runtime overhead* |
| module preempt/resume | 1241 | 1203 | |
| READ/WRITE_STORAGE_KEY | 719 | 719 | orders of magnitude faster than |
| READ/WRITE_STORAGE_HASH | 909 | 941 | equivalent TPM operations* |

In Table 4 above, performance overhead information for the present invention (again referred to in the table as "Bastion" performance) is summarized. Instruction counts are presented rather than cycle counts since the absence of an L2 cache, combined with the memory crypto engine (single engine for both encryption and hashing, clocked at less than a quarter of the memory frequency, with no caching of tree nodes) currently causes extremely high load latencies. The table shows the number of instructions that need to be executed to handle our various hypercalls and to enter or leave modules (depicted as "module call/return" and "module preempt/resume"). The secure_launch requires less than 15K instructions, which compares advantageously to the 468K instructions required to initialize an UltraSPARC virtual machine on the same platform. The module transition mechanisms of the present invention can enter and leave compartments in less than 2,000 instructions. With an operating system giving modules 10 ms quanta of CPU time, these overheads correspond to a performance hit of less than one tenth of a percent. On a 2 GHz CPU with enough L2 cache storage to support a throughput of 0.5 instruction per cycle, secure storage hypercalls execute in under 1 µs, several orders of magnitude faster than the sealed storage operations on a TPM chip.

Described now are software abstractions and interfaces that can be implemented by programmers of trusted software to utilize the present invention. These abstractions and interfaces form a Trusted Programming Interface (TPI).

As discussed above, all software running on the CPU of the present invention is part of a module: security-critical software components are encapsulated into trusted software modules while the remaining, untrusted parts of the software stack are in a generic untrusted module called module zero. Each trusted software module is accompanied by its own security segment, a data structure defining the module's code and data space, as well as the protection it must be provided with at runtime. Trusted software modules can invoke trusted computing services such as sealed storage and attestation via the Trusted Program Interface (TPI), which are calls to the hypervisor. Module zero is not protected by the present invention and its code and data space can expand arbitrarily at runtime; therefore, it does not have a security segment and it does not have access to trusted computing services.

Ideally, each security-critical task—e.g., protection of the user's e-banking data and transactions—should be mapped to a single module. All the persistent data linked to the task is thus sealed to this one module and a remote party wishing to inquire on the status of the task only has to ask this module for an attestation report. The present invention defines a trusted software module as having its code base fully contained in one thread, in one address space, in one privilege level and in one VM. Security-critical tasks that have code spanning multiple software entities must thus be split into several trusted software modules. A "trust domain" is defined as the set of trusted software modules collaborating towards the completion of a given security-critical task. The present invention provides primitives for secure inter-module collaboration, i.e., the protected exchange of commands and data between modules in a trust domain. This includes shared memory interfaces protected by the present invention. However, the actual crossing of software entities is left to existing software mechanisms, located within untrusted module zero.

The concept of the trust domain is especially useful in scenarios where different software vendors are in charge of writing the modules collaborating towards a given security-critical task, e.g., a trusted application-level library module written by vendor X, requiring the collaboration of a trusted OS device driver module written by vendor Y. In this case, each vendor writes its own module and defines its own security segment. The owner of the security-critical task—either one of the vendors, a user or a third party—then gathers the modules and defines the trust domain.

As discussed above in connection with FIG. 4, a trusted software module is defined by its security segment, a data structure that is part of the data space of the application or OS containing the module. As mentioned above, each security segment has different sections: the Module Pages section defines the set of virtual pages that are to be accessible to the module. Each entry in this section is a range of virtual addresses, associated with a set of access rights the module has to these pages. The Shared Pages section defines shared memory interfaces between the module and other modules in its trust domain. Each entry in this section contains a triple: (range of pages, module hash, RWX rights). The range specifies the virtual pages to be shared, the module hash identifies the module, within the trust domain, which is allowed to access these shared pages, and the RWX rights specify the Read, Write and eXecute rights for this module to these shared pages. Any page in Module Pages but not in Shared Pages is a private module page; it is accessible exclusively by the module being defined. The Authorized Entry Points section lists the entry points into module code that the present invention must check at runtime. The Module Stack Pointer section identifies the top of the module's private stack. Private module pages must be reserved for the module's private heap and stack. Modules requiring a heap must have their own copy of heap allocation functions, to allocate memory from the private heap pages. Given a security-critical task, one must first define a security policy specifying the data items to be protected, the operations allowed over these data and the authorized interactions with the outside world. Only then can the code and data used in completing the task be identified and partitioned into modules. Once modules are formed, they must be inspected for correctness and the absence of software vulnerabilities.

Trusted modules are typically orders of magnitude smaller than the commodity operating systems and applications, making it feasible to obtain formal security proofs for their code base. However, large modules such as a whole application or OS are supported by the present invention, to provide protection to legacy software that cannot be easily partitioned, e.g., when the source code is unavailable. In this regard, it is noted that security segments can easily be generated using a linker script (or map file) to map data structures, code routines and reserved pages to specific ranges of the virtual address space, and thus define the security segment.

Precise identification of modules is essential for the programmer wishing to establish a secure shared memory interface with another module. It is also central to the security of the sealed storage and attestation services offered by the hypervisor of the present invention, where a piece of persistent storage data or an attestation report is bound to a module identity. The present invention's definition of module identity includes three components answering the following questions: 1) What are you made out of?; 2) How are you protected?; and 3) Who do you trust? The first component is the module hash, a cryptographic hash taken over the initial state of the module's code and data space. The second component is the security segment hash, taken over the security segment, to reflect the protection requested by the module from the present invention. Finally, the trust domain hash is a fingerprint over the Trust Domain Descriptor, described next, which identifies the modules collaborating with the module of interest.

Figure 8:
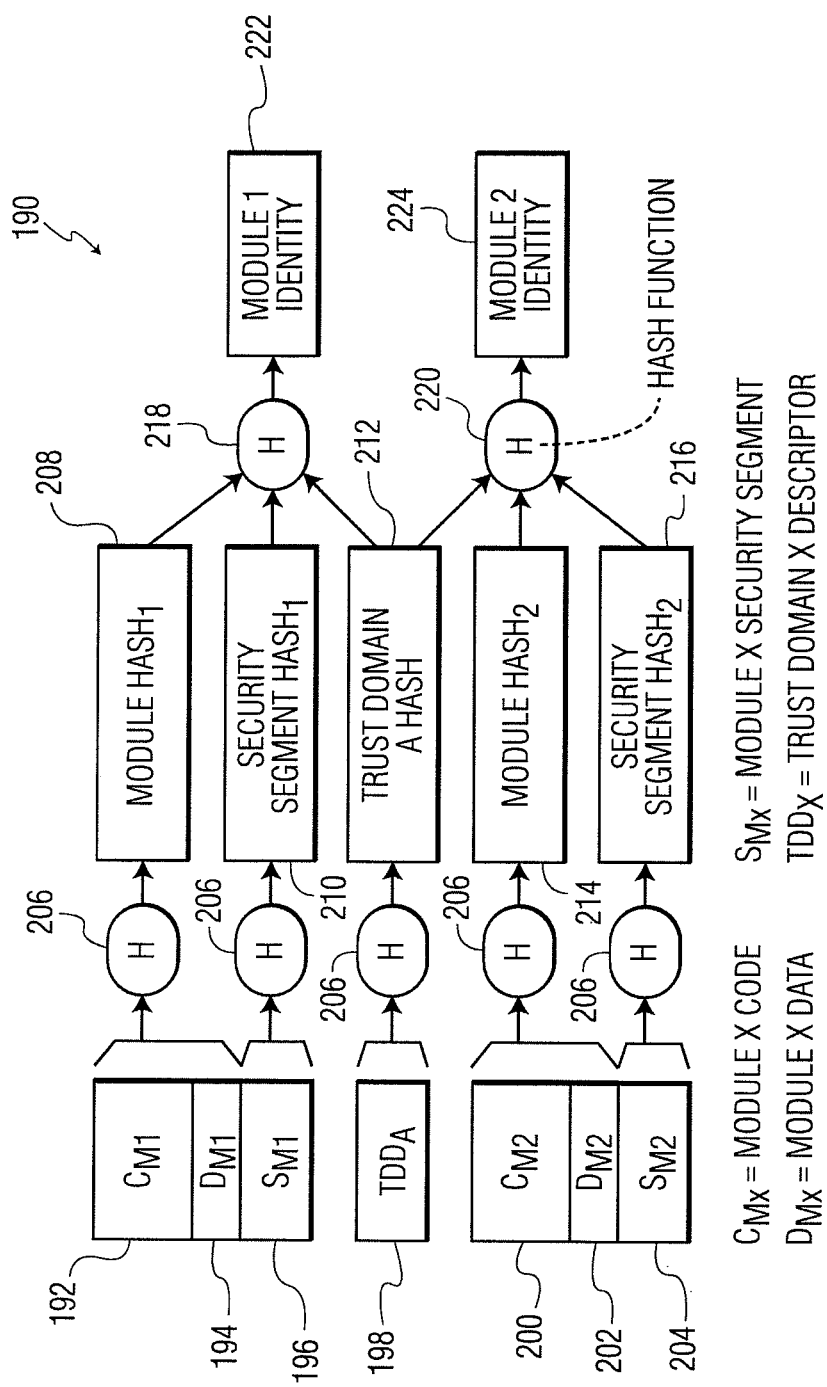
FIG. 8 is a diagram showing trusted domain services provided by the present invention for a plurality of trusted software modules.

FIG. 8 is a diagram showing a sample trust domain, indicated generally at 190, formed by the present invention. Module identities for two modules 222 and 224 are shown forming trust domain A. Taken as inputs are module code 192 and 200, module data 194 and 202, module security segments 196 and 204, and a trusted domain descriptor 198. These are processed by a plurality of hash functions 206 to provide a module hashes 208 and 214, security segment hashes 210 and 216, and a trust domain A hash 212. These, in turn, are processed by hash functions 218 and 220 to provide the module identities 222 and 224. The identity of a module is thus a cryptographic hash taken over the concatenation of these three hash values. This means that two copies of a given code and data component are considered to be different modules if they have different shared memory interfaces, authorized entry points or trust domains. A special module hash value (a hash taken over the value zero) is reserved to identify module zero in establishing memory interfaces with untrusted code.

Every module is part of a trust domain, which consists of one or more software modules trusted to carry out a given security-critical task. In addition to its security segment, each trusted software module comes with its trust domain descriptor which is a list of (module hash, security segment hash) pairs. For a given trust domain, the descriptor contains one such pair for every module in its domain. The trust domain descriptor can thus be used to recover the module identity of every module in the trust domain. Module hashes used to identify sharing modules in the security segment are thus sufficient to precisely identify the sharing module.

Trusted modules must validate any data they receive from outside their trust domain, i.e., from module zero or from a module in another trust domain. This can be a formal cryptographic validation using keys from the module's sealed storage area, or simply an application-specific check. For example, data from a remote host may transit via an untrusted network, and be handled by an untrusted network stack before reaching a trusted application module. The module and the host can then agree on a Message Authentication Code (MAC) scheme, using pre-established keys shared with the remote host and stored in its sealed storage area. This allows the module to cryptographically validate the integrity of messages it receives from the untrusted network stack, to detect whether they have been tampered with on the way from the remote host. As another example, a trusted database manager module may receive database queries from untrusted software. In this case, the module should perform checks on the queries to ensure they do not try to access data in a way that violates the module's security policy.

Trusted Programming Interfaces (TPI) in accordance with the present invention are hypervisor interfaces that must be used by trusted software modules in order to obtain protection and trusted computing services. Described are module transition hypercalls in the context of trusted domains, which allow call to and returns from trusted software module code.

As discussed above, for module launching, a trusted software module uses a new secure_launch hypercall to request that the hypervisor creates a protected execution environment for it when it is first launched. The two arguments to the hypercall are pointers to the security segment and the trust domain descriptor. The hypervisor parses these data structures to determine the set of private and shared module pages. As it does so, the hypervisor computes the three components of module identity and activates hardware-based runtime memory protection mechanisms for the module's pages. The hypervisor then establishes shared memory interfaces requested in the module's security segment. Finally, the hypervisor checks whether the identity of the module corresponds to a module identity associated with a piece of sealed data. If so, it unlocks the sealed storage.

Following the completion of secure_launch, the present invention enforces the following security properties: 1) module code can only be invoked via the new CALL_MODULE hypercall (described herein), through an entry point authorized in the security segment, and with its initial stack pointer set to the value defined in the security segment; 2) module code can only be exited via the new RETURN_MODULE hypercall (described herein) or on an interrupt, via hypervisor-mediated preemption; 3) module data can only be accessed by module code, except for data in shared memory interfaces; 4) data in shared memory interfaces can only be accessed by the module itself and by the sharing modules identified in the security segment; and 5) module state in memory (hardware RAM chips) and on external memory buses is automatically encrypted and hashed by the hardware on exiting the processor chip.

For module transitions, a trusted software module's functionality and caller code—either in module zero or in a trusted software module—must use the new CALL_MODULE hypercall. The arguments to this hypercall are a module hash, identifying the callee module, and a virtual address identifying an entry point into callee code. The caller and callee modules must be part of the same virtual address space, at the same privilege level. The hypervisor intervenes to check the legitimacy of the transition, record the calling site and carry out the jump to callee code. When the callee module is done with its computation, it invokes the new RETURN_MODULE hypercall, which does not require any arguments. The hypervisor services this hypercall by checking that it matches a previously validated CALL_MODULE, and returns to caller code, at the instruction following the registered call site.

For sealed storage, a module can seal persistent security-critical data to its identity as follows. First, it must generate a symmetric encryption key K and use it to encrypt the data. Second, it must compute a cryptographic hash H over the resulting ciphertext to fingerprint the data. Then, the module must invoke the WRITE_STORAGE_KEY and WRITE_STORAGE_HASH hypercalls, with the key or hash as the argument, respectively. The data thus protected can then be written to the untrusted disk using an untrusted file system manager in module zero. Following a reboot of the platform, a securely launched trusted software module can recover this key and hash by invoking the READ_STORAGE_KEY and READ_STORAGE_HASH hypercalls. The hypervisor will only return a (key, hash) pair to the module if the pair is sealed to a module identity matching the one computed during the requesting module's secure_launch invocation. The key and hash can then be used to decrypt the contents of the module's secure storage area and verify its integrity.

For attestation, trusted software modules can attest to their identity or certify a computation result for a remote party, by invoking the hypervisor's ATTEST hypercall. This takes two pointers as arguments, one pointing to the data to certify (if any), the other pointing to a module memory region where the attestation report should be returned. The hypervisor services this hypercall by creating an attestation report, signed by the processor, which includes the module data to be certified, the identities of all modules within the requesting module's trust domain and the identity of the hypervisor. Table 5, below, summarizes the hypercalls implemented by the hypervisor of the present invention:

TABLE 5

| New Hypercalls | Arguments |
| --- | --- |
| SECURE_LAUNCH | security segment |
|  | trust domain descriptor |
| CALL_MODULE | module hash |
|  | entry point |
| RETURN_MODULE | none |
| READ_STORAGE_KEY | key buffer |
| READ_STORAGE_HASH | hash buffer |
| WRITE_STORAGE_KEY | key buffer |
| WRITE_STORAGE_HASH | hash buffer |
| ATTEST | data to certify |
|  | attestation report buffer |

The improved security, scalability and performance of the foregoing trusted computing primitives of the present invention, as well as the present invention's fine-grained protection of trusted software modules, permits the development of the following new classes of software applications.

Self-Protecting Objects: The present invention's protection of low-overhead software modules that encapsulate arbitrarily small amounts of data and code permits thousands or millions of protected compartments. Each compartment could contain as little as one data structure and the code routines trusted with reading and writing that data structure. With the hardware enforcing that a data structure cannot be accessed except through its associated code routines, which can implement arbitrary security polices for this data, self-protecting objects can be provided. This mimics the object-oriented programming paradigm of a class, which groups access routines and operators for a given set of data. The class construct provides a useful abstraction for the programmer, with cleaner interfaces, thus reducing the chances for programming mistakes that could corrupt the object. However, the class cannot provide runtime protection against intentionally malicious code in the rest of the application or in the OS, and it does not protect against physical attacks. With the present invention, each data item, encapsulated in a module with its methods, is provided with runtime protection against these threats. Moreover, these modules can contain methods that flush dynamically modified state, encrypted and hashed, to a protected persistent storage area sealed to the module's identity. This protects against offline attacks on the module's persistent state, which could be stored locally on the platform's disk, or remotely on network or "cloud" storage systems. Finally, fine-grained provision of attestation services allows the object itself to attest to its identity and the current state of its data items to remote parties interested in particular aspect of the system (e.g., "What is the state of your firewall rules file?").

Protected Monitor: Dynamic binary translators, application-level sandboxes (e.g., the Java Virtual Machine) and OS-based rootkit detectors all do some form of security-critical monitoring. While they try to detect or prevent security violations, they are themselves exposed to attacks from a compromised OS or physical attacks. The present invention can protect a monitor within a potentially compromised software stack, and allow the monitor to securely report on its status using attestation services. Sealed storage services also allow the monitor to maintain an audit trail that only it can modify, even if the OS has been hijacked or the physical disk has been stolen.

Hardened Extensions: Modern application or operating system software is often dynamically extendible. These extensions may contain security-critical code or manipulate sensitive data—e.g., an e-banking browser plug-in, a digital rights management (DRM) media player plug-in or a device driver for secure display hardware (e.g., HDCP). Unfortunately, their security is usually fully dependent on the correctness of all the code located within the address space where they are "plugged in". With its fine-granularity protection, the present invention allows for trusted application plug-ins or security-critical device drivers to be protected from software vulnerabilities in the surrounding code base and from physical attacks (e.g., a user trying to violate DRM restrictions by using a hardware "mod chip").

The secure module hypercalls of the present invention permit secure invocation of a module B by a module A as a pair of code jumps, a call and a return, that must respect the following conditions: 1) the call must be initiated from an explicit calling site in module A; 2) the call must jump to an authorized entry point in module B's code; 3) B must only return to A's calling site; and 4) B must return to A using an explicit return directive. A programmer must use the CALL_MODULE and RETURN_MODULE hypercalls, discussed above, when invoking the functionality of a trusted software module, thereby ensuring conditions 1 and 4 above. As it mediates transitions, the hypervisor of the present invention sets the module_id in the current_module_id register. Enforcement of conditions 2 and 3 is done by the hypervisor, as it services these new hypercalls. On a CALL_MODULE (callee's module hash, entry point) hypercall, the hypervisor checks that this is a permitted entry point. The entry point argument must be specified as an immediate, not a register, to allow a remote party to check for authorized explicit module transitions during attestation. On servicing a RETURN_MODULE hypercall, the hypervisor ensures that the callee module returns to the instruction following the calling site in the caller module.

Module Interrupts: To protect the general-purpose register contents of a module upon preemption by a hardware interrupt, the hypervisor intervenes before CPU control is handed over to a guest OS. The hypervisor saves the contents of the module's registers into hypervisor memory—where register confidentiality and integrity are protected—and wipes out the contents of the hardware registers. When a module is resumed by the guest OS, the hypervisor intervenes to restore the register contents of the module and ensure it resumes where it was initially suspended. Thus, software executing between the suspension and the resumption cannot observe or corrupt the trusted module's register contents.

The present invention also provides the following trusted computing services, which are described below in detail.

Root Key Protection: The present invention protects root keys for sealed storage and attestation the same way TPM does: by storing them in dedicated hardware registers. The processor-based registers of the present invention offer stronger protection than TPM-based registers since successful probing of a complex processor chip is much harder than probing a TPM chip manufactured out of simpler IC technology.

Secure Inter-Module Collaboration: The present invention provides a new service: secure collaboration between trusted modules in a trust domain, as well as with the untrusted module zero (which includes the commodity OS). Modules can collaborate within applications, within an OS, across applications, across privilege levels and across virtual machines. Any interaction a trusted software module has with protected modules from another trust domain is treated as collaboration with module zero. An example of such inter-module collaboration, between two modules A and B, occurs as follows: 1) A invokes B; 2) A transfers invocation parameters to B; and 3) B returns computation results back to A. Invocation parameters and return results can be exchanged between modules using one or more memory pages they share together. This is a secure interface for passing data that modules can specify. Shadow Access Control protects these shared pages from access by other modules, and runtime memory protection mechanisms ensure they cannot be observed or tampered with by physical attackers. To support existing software conventions, where function call parameters and return results are often passed via processor registers, the CALL_MODULE and RETURN_MODULE hypercalls of the present invention leave register contents intact to allow for register passing of values. Thus, there are two ways to exchange data between caller and callee: registers and shared memory.

Figure 9:
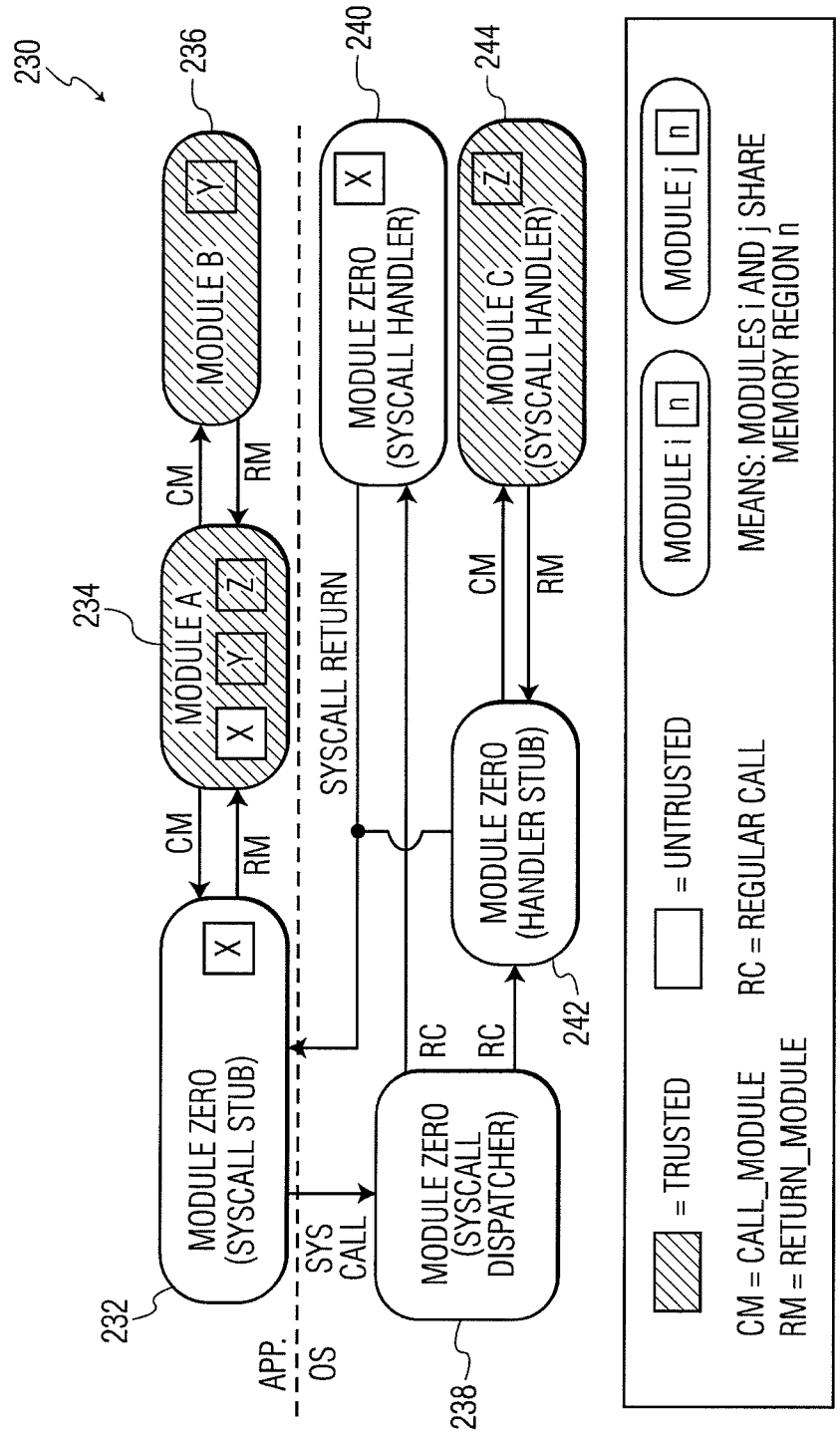
FIG. 9 is a diagram showing trusted module interactions facilitated by the present invention.

FIG. 9 is a diagram showing secure inter-module collaboration provided by the present invention. A trust domain 230 which includes three trusted software modules 234, 236, and 244 within an untrusted software stack is shown. Modules A (234) and B (236) are trusted modules in the same untrusted application running in user mode, while module C (244) is a trusted system call handler within an untrusted commodity OS. To interface with untrusted code, modules A and C require stubs 232 and 242 (the "syscall stub" and the "handler stub," respectively), which are small code routines in the untrusted module zero. Module A collaborates with module B in application space, and it also makes system calls to an untrusted handler 240 in module zero and to Module C, a trusted system call handler. A module zero dispatcher 238 communicates with the module zero stubs 232, 242 as well as the module zero syscall handler 240. As an example, module A may be a Digital Rights Management (DRM) plug-in in a media player application, B is a crypto library, C contains the device driver for trusted display hardware (e.g., using High-Bandwidth Digital Content Protection (HDCP) technology) and the untrusted system call handler is the file system manager used to access the untrusted disk. The owner of the content protected by the DRM module trusts A, B and C to enforce its security (DRM) policy on media files.

Untrusted System Call: Referring again to FIG. 9, when A needs to access files from the untrusted disk, it invokes the untrusted file system manager via a system call. To do so, module A must invoke the module zero system call stub with a CALL_MODULE hypercall, with invocation parameters in registers or in the memory region X it shares with the stub. The stub then carries out the system call, which gets handled by the untrusted handler. This handler returns into stub code, which resumes module A execution by invoking RETURN_MODULE.

Status codes should be returned via registers while large data items produced by the system call handler for Module A are returned via the memory region X it shares with A.

Trusted Application-level Call: Again referring to FIG. 9, assume that module A has in its protected persistent storage area, a Message Authentication Code (MAC) key and a decryption key. With these keys, it can decrypt the data it fetches from the untrusted disk, and verify their integrity. To perform decryption and verification, module A invokes functions from the cryptographic library in module B. The two modules are in the same thread and the same address space, so they can use the CALL_MODULE and RETURN_MODULE hypercalls to perform direct jumps to one another's code base. Some invocation parameters can be securely exchanged via registers, e.g., a constant identifying the type of cryptographic operation requested. Larger data items like the ciphertext data are passed between modules via the protected memory interface Y they both share.

Trusted System Call: Operating system components performing security-sensitive operations are encapsulated in new trusted OS modules. These OS-based modules must be accessible via a system call to allow for (trusted or untrusted) application-level software to request their services. As shown in FIG. 9, module A requests the display of content-protected media frames to the trusted device driver in module C. In this case, invocation parameters that are not security-sensitive—e.g., the system call number—are passed to the untrusted "syscall stub" via registers. Parameters that are passed via registers are subject to corruption by the software in module zero. Hence any security-sensitive invocation parameter or computation result exchanged between A and C must be passed via the shared memory region Z, protected against software and hardware attacks.

An important design goal of the foregoing secure module collaboration mechanisms is to preserve compatibility with existing software conventions. To this end, the present invention allows for both register and memory passing of arguments within virtual address spaces.

OS-based trusted modules are supported by the present invention by loading them and their stubs via existing mechanisms such as Linux loadable kernel modules and Windows kernel extensions, without having to modify the core OS code base. Having to go through module zero to reach an OS-based handler gives malicious software the opportunity to drop or re-route the system call. From the point of view of the application, this amounts to denial of service.

Other Types of Calls: Several other collaboration capabilities are provided by the present invention. For example, calls between two trusted modules across threads follow a similar path as for trusted system calls, with module zero stubs in both threads. The main difference is that a thread switch rather than a system call (privilege switch) must occur to transfer control from the caller module's stub to the callee module's stub. The same logic applies to inter-application and inter-VM calls, where the module zero stubs must trigger (or wait for) an application switch (e.g., a remote procedure call) or a VM switch (e.g., the VM containing the callee module gets scheduled by the hypervisor).

Module Cross-Authentication: An essential security objective in module collaboration is to ensure that callers and callees can authenticate one another to avoid impersonation. In the example shown in FIG. 9, modules B and C must be able to tell whether they have been invoked by the trusted software module A or by some untrusted code in module zero. If impersonation were to happen, B and C might operate over corrupted invocation parameters, produce erroneous results or even be tricked into writing sensitive data to untrusted space. Similarly, A must be assured that its invocation parameters are accessible only to B (or C), and that the return results it receives were indeed produced by B (or C).

When invocation parameters and return results are exchanged via shared memory, impersonation is prevented by the Shadow Access Control mechanism of the present invention, set up by the secure_launch hypercalls for both modules. Sharing is set up for specific memory pages only if both modules agree on one another's identity, as defined by their security segments. This means that at runtime, A can write to memory region Y and be assured that only module B can read the data. If module B is not launched, or if a corrupted version of it is launched, the shared memory interface will not be set up by the hypervisor, so the data written by A will remain accessible only to A. Similarly, A can read data from memory region Y and be confident that it was produced by module B, the only software entity, other than A, which has access to Y. This is also true for module B. The same properties hold for memory regions shared across privilege levels.

Invocation parameters and return results can only be exchanged via registers when the two collaborating modules are within the same address space, with the same privilege level. In this case, impersonation of the callee is prevented by the hypervisor as it processes the CALL_MODULE hypercall. The module hash used by the caller as an argument to CALL_MODULE refers to a specific module within the caller's trust domain. The hypervisor guarantees that the CALL_MODULE will either transfer control to the specified callee or return immediately to the caller (e.g., if the callee has not yet been launched). Hence, sensitive register values can only be revealed to the caller or the callee.

For the callee, authenticating the caller is less "automatic." The hypervisor of the present invention does not restrict invocations of CALL_MODULE: any module, including module zero, can use CALL_MODULE to invoke a callee module, as long as it uses an entry point authorized in the callee's security segment. It is up to the callee to identify the caller, and accordingly, determine whether it wants to satisfy the caller's request for processing. Identification of the caller by the callee can be done using the authenticated memory interfaces. For example, module A can confirm that it is the caller by writing a pre-determined "I called you" message to memory region Y. Module B can then confirm it was invoked by module A by reading this message from Y before doing any processing on the register values it received upon invocation. This also allows trusted software modules to adapt their computations based on the identity of their callers.

The present invention also provides a new form of functional attestation, referred to herein as tailored attestation. The procedure, handled jointly by the trusted hypervisor and the processor, reports only the modules in a trust domain D to the remote party. This is in contrast to existing attestation techniques, which reports all software modules executing on a processor. It also gives the remote party a way to securely communicate with these modules, despite possible corruption in some other parts of the software stack. This is a significant improvement over TPM-based methods where an entire software stack is reported, requiring the remote party to inspect a very large code base before it can trust the attesting software.

On receiving an attestation request, a module generates an asymmetric key pair to be used to establish a secure channel with the remote party. The module stores the private part of this key pair in an encrypted and integrity-checked page and creates a certificate for the public part of the key pair. It then invokes the hypervisor's Tailored Attestation routine via the ATTEST hypercall to request an attestation report binding trust domain D's descriptor to the public key certificate it just generated and the identity of the hypervisor. The hypervisor compiles the report by combining the module's certificate with the trust domain hash for D and then asks the processor, via the new attest instruction, to add the hypervisor identity to the report and sign it with the CPU's private key. The attest instruction invokes an on-chip attestation routine stored and executed within the processor chip (like the secure_launch routine for hypervisor launch.

Figure 10:
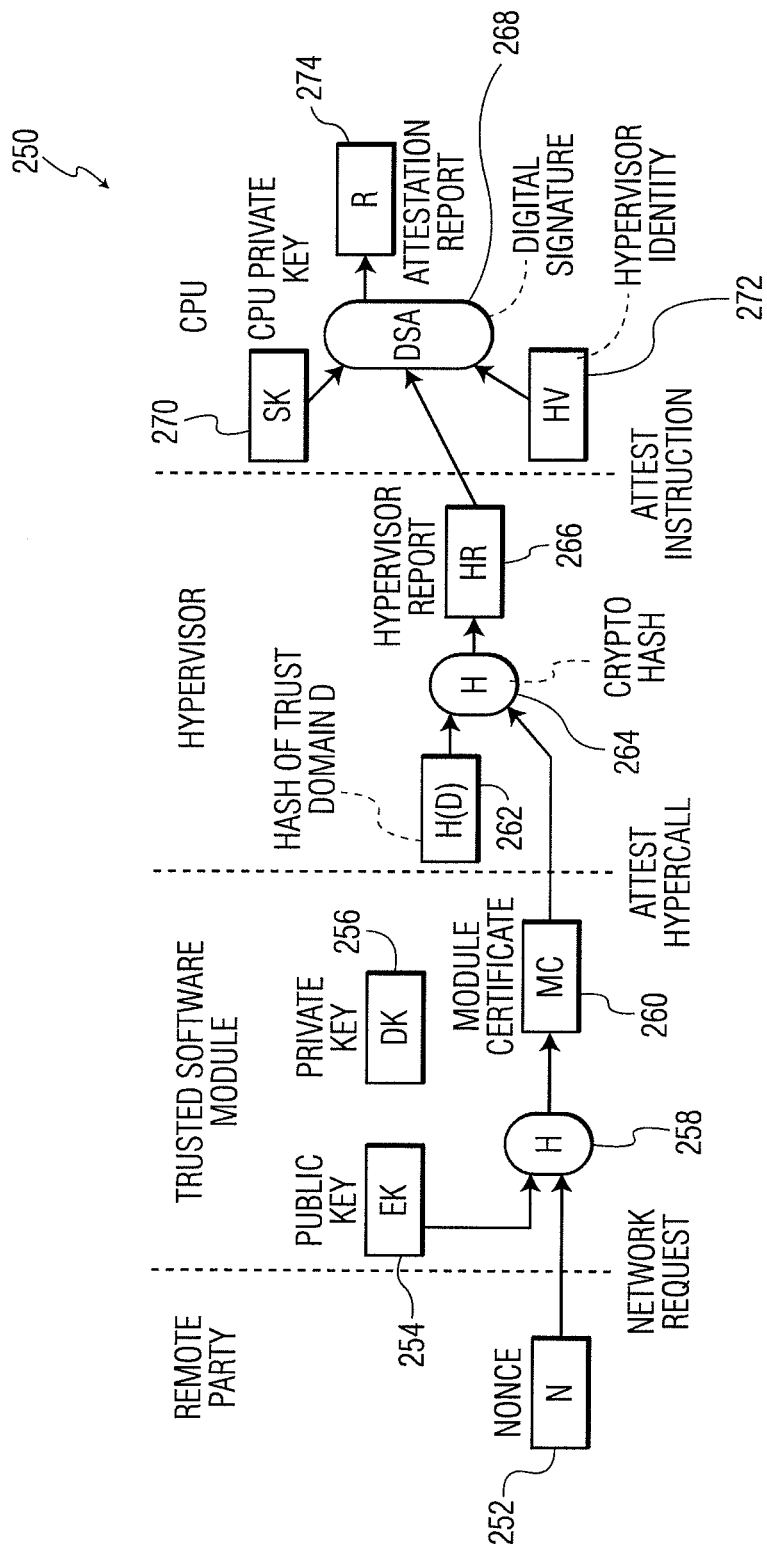
FIG. 10 is a diagram showing functional, run-time attestation reporting services provided by the present invention.

FIG. 10 is a diagram showing processing steps of the tailored attestation procedure of the present invention, indicated generally at 250. An attestation request from a remote party is made to a trusted software module in D with a session nonce N (labeled 252) for freshness. When the module receives this request for attestation, it first generates a public-private key pair 254, 256 (EK, DK) and creates a certificate MC 260 using a hash function 258 to bind the public encryption key EK to the session's nonce N. The module then invokes the hypervisor of the present invention, which adds the trust domain hash 262 identifying the modules in D, using a hash function 264. This produces a hypervisor report 266. The processor's attestation function 268 is then invoked. With its private key SK 270 (in a dedicated cpu_key register), the processor signs an attestation message binding the hypervisor identity HV 272 to the combined module identities in H(D) and the certificate MC and to produce an attestation report 274. The signature (not shown) and the session's public encryption key EK 254 are returned to the requester, along with the attestation report 274 which includes metadata identifying the processor (i.e., the processor's signature verification key), the hypervisor (HV, the hypervisor's identity), and the modules (their full trust domain descriptor).

The requester uses a Public Key Infrastructure (PKI) to check that the platform's reply comes from a trustworthy processor and, using a local or online trusted database, verifies that HV and the module hashes in H(D) correspond to trustworthy versions of the hypervisor and the required security-critical modules. It also checks that the security segments in H(D) define runtime protections in line with the requester's security requirements. When these checks are successful, the requester can trust that: 1) the processor protects hypervisor execution; 2) the TCB protects the trusted modules specified; 3) the transitions between the modules are checked (inferred from the position of the CALL_MODULE and RETURN_MODULE hypercalls); and 4) the modules in D securely exchange data via the protected interfaces defined in the security segments of H(D).

With the tailored attestation report, the remote party can be confident that a secure channel established using the session's public encryption key EK is only accessible to the protected modules reported during attestation. Additional information required by the remote party to make a trust decision can also be included in the certificate created by the critical module, e.g., configuration data used upon launch of the module. Attestation reports can be requested multiple times during a module's execution, e.g. before executing the module, to establish new key material, to establish configurations, to verify that a particular set of modules is still alive and protected, or to attest to data results produced.

The present invention permits sealed storage to be defined as persistent storage that can only be created or accessed by a trusted module. The hypervisor uses its own secure storage area anchored in the processor hardware to protect the secure storage areas of trusted software modules. The hypervisor seals a module to its secure storage area by labeling the key and hash pair protecting the area with the module's identity. A module issues WRITE_STORAGE_KEY and WRITE_STORAGE_HASH hypercalls to commit its storage key and storage root hash, to the hypervisor's secure storage area. This area is in turn sealed by the CPU to the hypervisor's identity so that it can only be accessed by the hypervisor who created it. The hypervisor uses this area, which can be arbitrarily large, to protect secure storage areas for an arbitrary number of trusted software modules in the virtual machines it hosts.

Any hypervisor securely launched via the new secure_launch instruction can create a secure persistent storage area, either on disk or in flash memory. To do so, the hypervisor must first generate a symmetric encryption key, encrypt the data to be stored and fingerprint it with a cryptographic hash function. The hypervisor then writes the resulting (hash, key) pair into dedicated non-volatile hardware registers, the new secure_storage_hash and secure_storage_key registers. As it carries out the register writes, the CPU seals the newly created storage area to the hypervisor's identity by copying the contents of the hypervisor_hash register into the secure_storage_owner register. To reflect an update to its secure storage area, the hypervisor writes the updated fingerprint to the secure_storage_hash register.

Upon a platform reset, the secure_launch instruction checks whether the hypervisor being launched is the owner of the secure storage area currently rooted in hardware. It checks whether the value just computed into the hypervisor_hash register is equal to the value in the secure_storage_owner register. If so, it "unlocks" the hypervisor secure storage area by giving the hypervisor read access to the secure_storage_hash and secure_storage_key registers. If not, it zeroes the secure_storage_hash, secure_storage_key and secure_storage_owner registers. This prevents different hypervisors from accessing one another's secure storage areas and locks corrupted hypervisors out of a good hypervisor's secure storage.

Similarly to TPM, trusted authorities are implemented in the present invention, from which the hypervisor can request migration and backup services. The hypervisor can establish a secure communication channel to such an authority by authenticating the authority using a public key embedded in its data space.

To make the trusted computing primitives of the present invention trustworthy, the architectural roots of trust are contained within the CPU chip—the security perimeter and the hardware component of the present invention. Trust for measurement and reporting of the trusted hypervisor (the software part of the present invention) is established by the combined effect of the on-chip secure_launch routine, the on-chip attest routine and two hardware registers storing the hypervisor measurement (hypervisor_hash register) and the CPU signing key (cpu_key register) for signing attestation reports.

The two routines, for measurement and for reporting, can be stored within the CPU chip (to prevent physical attacks), in Read-Only Memory (ROM) so they cannot be modified after manufacturing. It is assumed the CPU private key is generated by the (trusted) manufacturer and written to a dedicated write-once CPU register during chip fabrication; this register is only accessible to the on-chip attestation routine. Other private key initialization schemes such as those supported by the TPM could be implemented to support different trust models.

The roots of trust for hypervisor sealed storage are in non-volatile CPU hardware registers, ensuring that they are out of reach of physical attackers, even when the platform is powered down. The trusted secure_launch routine ensures that the hypervisor creating a sealed storage area (identified in the secure_storage_owner register) is the only one that can read the key encrypting the storage area (in the secure_storage_key register) or update the current valid state of the hypervisor's area by writing the secure_storage_hash register. Malicious or corrupted hypervisors are thus locked out of a good hypervisor's sealed storage area.

On every chip reset, the symmetric key for memory encryption is generated anew using an on-chip random number generator, and the root hash of the memory integrity tree is recomputed by the secure_launch routine. Because they are stored in dedicated on-chip registers, these two hardware roots of trust for memory protection are inaccessible to software and physical attackers. The regeneration of the memory encryption key upon processor reset ensures that knowledge of (plaintext, ciphertext) pairs in one power cycle does not give an attacker information about encrypted memory contents in another power cycle. The regeneration of the root hash of the memory integrity tree for the hypervisor's memory space ensures that memory contents cannot be replayed across power cycles. Thus, the hardware registers and associated mechanisms of the present invention protect the hypervisor, its memory space and store. The hypervisor in turn protects critical OS and application modules.

As opposed to platforms that carry out a secure boot (e.g., where only signed pieces of software can be launched), the present invention performs a measured boot (as in TPM), where critical software is precisely measured upon launch, so it can be reported during attestation and analyzed by the recipient of the attestation report. Module-specific sealed storage areas are bound to these measurements. The security of the measured boot, carried out by the secure_launch hypercall, thus depends on: 1) precisely measuring the identity of software being launched; and 2) protecting the integrity of this identity measurement until used in attestation or used to create or unlock a sealed storage area. In the present invention, the attestation report on a critical software module not only fingerprints the bits forming its initial state (with the module hash), but also describes the protection provided to the software during runtime (with the security segment hash). This protection information allows recipients of attestation reports to reason about whether software can respect certain security requirements when it runs in an adversarial environment. Indeed, the security segment identifies the module pages kept private and gives a precise definition of memory interfaces and code entry points to be authorized during runtime.

As with any component of the module's identity, the security segment can be corrupted by an attacker with access to the binary file storing the component on-disk. This is not a concern since the platform is performing a measured boot, where the recipient of the attestation report can choose not to entrust a software component with critical data in the case of an unexpected security segment hash. To protect the integrity of module identity measurements, the secure_launch hypercall stores them within the hypervisor's protected memory space.

Protecting the runtime state of a software module (or the hypervisor) involves providing strict isolation for certain parts of its code and data space, while enforcing restricted interfaces to surrounding software for other parts of its memory space. A module's code space is static and must be protected by strict isolation. This prevents corruption (through malice or malfunction) by other modules within the same address space, by the OS or by physical attacks. To prevent software attacks, the hypervisor of the present invention overrides guest OS memory management: the hypervisor marks a machine page containing critical code as read-only in its shadow page tables. To thwart corruption of critical code by the OS during paging, by a rogue DMA transaction or by a physical attack, the integrity tree detects corrupted code and prevents that software module from executing. The hypervisor code itself is protected by the integrity tree and by the processor's hypervisor mode (negative ring). Static data are protected with the same mechanisms as static code.

Typically, most of a module's data space also requires strict isolation: it must be unavailable to surrounding software, but remain accessible to the module's code for reading and writing. Shadow Access Control achieves this by binding code and data pages to a unique module_id and having the hardware enforce the following rule: a data page bound to module_id X can only be accessed by code from a page bound to module_id X. Similarly, dynamically-generated or self-modifying code in module Y can be located in pages assigned module_id Y that are accessible for reading, writing and execution. The recipient of an attestation report for such code decides whether to trust module Y by analyzing the static routine generating the dynamic code or the initial state of the self-modifying code (e.g., to check that they cannot generate runtime code that would overwrite critical data structures).

Confidentiality of hypervisor and module data is ensured in part by Shadow Access Control since pages with confidential data can be made accessible only to specific software modules. In addition, setting a page's c_bit to '1' ensures it is encrypted when it leaves the processor chip, thus protecting its confidentiality against attacks that target machine memory directly.

A software module is impractical unless it has access to inputs from outside its private memory space and can output results to surrounding software. The present invention supports critical module communication with the outside world using restricted memory interfaces shared either with other protected modules or with unprotected code. To share a page between two modules, the hypervisor creates two shadow page table entries bound to two different module_id's but pointing to the same machine page. These sharing interfaces are only created based on directives in the security segments, which are included in attestation reports.

The hypervisor disallows sharing in the case of conflicting directives so the remote party can be confident that a given module only communicates with the outside world through the reported interfaces. When a critical module is interfaced with another protected module, the remote party must decide—based on the attestation report—whether to trust this other module. When a critical module is interfaced with an unprotected module (which cannot be trusted), the remote party must determine whether the critical module validates its inputs and filters its outputs according to its security requirements. This restricted interface mechanism can be used to dynamically link code libraries to existing modules. To do so, the hypervisor assigns a different module_id to the library and sets up a sharing interface between the library and the existing module.

Figure 11:
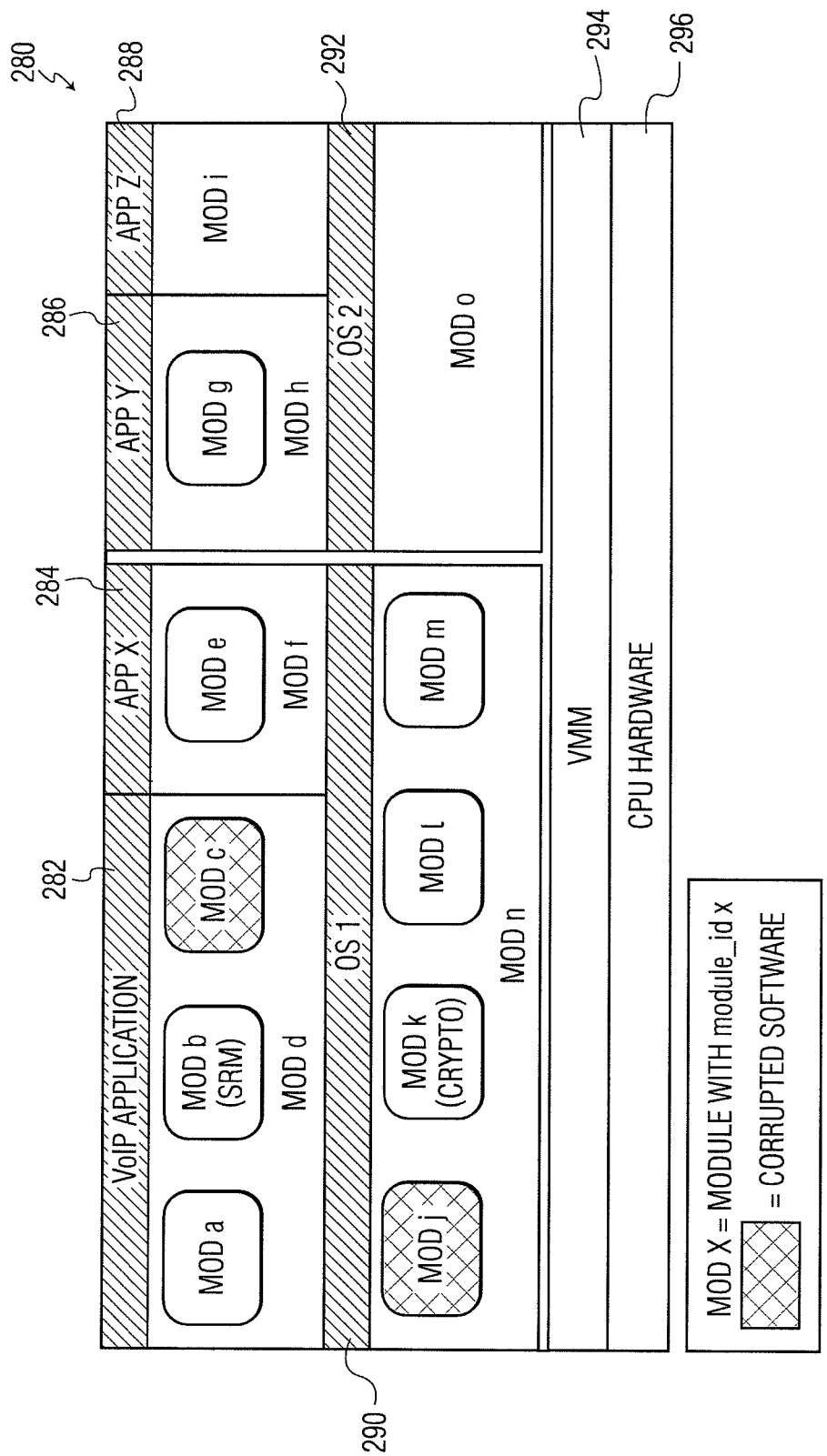
FIGS. 11-12 are diagrams showing secure on-chip services provided by the present invention for a Voice-over-Internet Protocol (VoIP) application.

FIG. 11 is a diagram showing the present invention implemented in a computer system 280 to provide trusted computing services for a Voice-over-IP (VoIP) software application 282. As shown, the VoIP application 282 could execute on a single CPU 296 (modified in accordance with the present invention), a Virtual Machine Monitor (VMM or hypervisor) 294 (implemented as discussed herein in accordance with the present invention), two operating systems 290 and 292, and a plurality of software applications 284-288. The VoIP application 282 runs a Secure Routing Module (SRM) which accesses a VoIP network (referred to as peer-to-peer voice network, or "P2Pcall") to inject the user's outgoing VoIP packets, extract the packets directed to the user, and route packets of other VoIP callers. The VoIP network allows trustworthy SRMs to access a peer-to-peer network by giving them a session key K with which they can open secure communication channels with nearby nodes. The VoIP security policy defines a trustworthy SRM as a module routing calls according to the VoIP system's routing algorithm: it does not modify or drop them. When used as a mobile device in emergency or military settings, an SRM also should exhibit resilient operation, even when unrelated parts of the system may have been compromised.

Modules depicted in the software stack shown in FIG. 11 are a voice acquisition module (mod a), an SRM module (mod b), a chat module (mod c), and a main module (mod d). The SRM collaborates with an OS-based library of cryptographic functions (module k) to establish and maintain secure channels. Using the tailored attestation feature of the present invention, the platform reports to the P2Pcall server the identity of the hypervisor 294 (or, VMM, as referred to in the drawings), the SRM and the OS-based crypto module. The SRM defines a public-private key pair for the current attestation. The public portion EK of this key pair is used by the server to encrypt the session key, which the SRM can decrypt using DK, the private portion of the key pair. The processor 296 has its own key pair for digital signatures, with its private signature key SK stored on-chip in a new processor register and its public verification key VK stored in the VMM memory space. SK is similar to the Endorsement Key on a TPM chip, or the private processor key.

Figure 12:
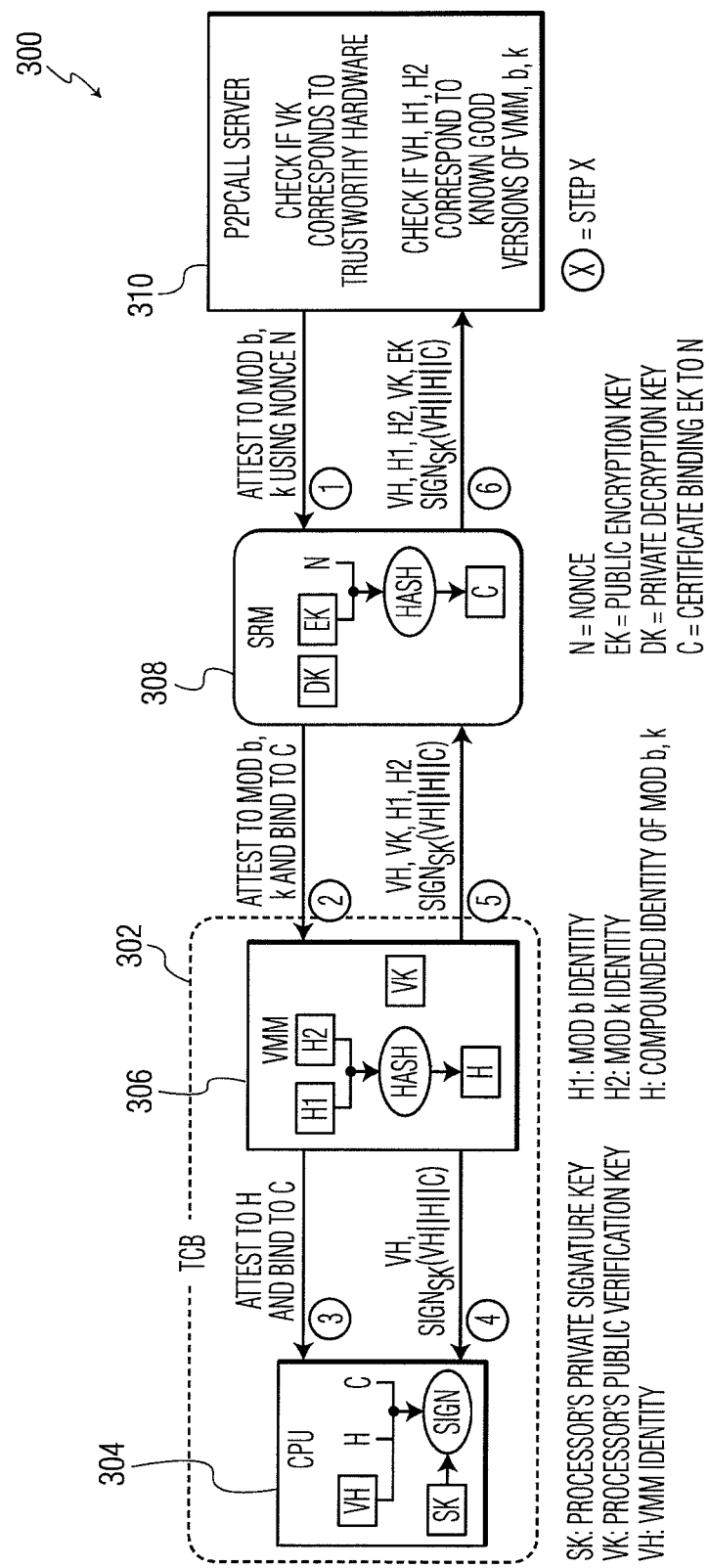

FIG. 12 is a flow diagram showing tailored attestation of the present invention implemented in a VoIP setting, indicated generally at 300. The term Trusted Computing Base (TCB) as used in FIG. 13 (and labeled with reference numeral 302) includes the CPU 304 and hypervisor (or, VMM) 306 of the present invention. When the SRM (labeled 308) receives a request for attestation from a P2Pcall server 310 (step 1), it first generates a public-private key pair (EK, DK) and creates a certificate C binding the public encryption key EK to the session's nonce N used by the server for freshness. The VMM 306, invoked by the SRM module (step 2), then creates a compounded identity H from the identities H1 and H2 of modules b and k, and invokes the processor's attestation function (step 3). With its private key SK, the processor signs an attestation message binding the VMM identity to H and C (step 4). The signature is sent to the server 310, along with metadata identifying the processor (VK, the processor's signature verification key), the VMM (VH, the VMM's identity), the modules (H1 and H2, their respective identities) and the public encryption key EK (steps 5 and 6). The server 310 uses a Public Key Infrastructure (PKI) to check that the platform's reply comes from a trustworthy processor and, using a local or online trusted database, verifies that VH, H1, and H2 correspond to trustworthy versions of the VMM, the SRM and the crypto module. When these checks are successful, the server can trust that 1) the processor protects VMM execution, and 2) the TCB protects the two critical modules specified. Since the decryption key DK corresponding to EK is stored in the SRM's protected memory space, the server 310 can also be confident DK will only be used by the SRM. The server 310 can thus use the public encryption key EK bound to the attestation message to encrypt the session key K (not shown). K can then be used by the SRM to open secure communication channels with nearby P2Pcall nodes.

Tailored attestation allows the platform to attest to the SRM and the crypto module upon request by the server, without having to report the identity of the surrounding software stack. The attestation report identifies the modules and the VMM using a hash computed at launch time over their state and confirms, with a signature over the identities, that they have not been corrupted ever since. If one of the modules requested has been corrupted, the attestation procedure excludes the module from the attestation report to indicate corruption. This runtime functional attestation is possible even if attacks on other modules protected by the platform (modules c and j) have been detected (and contained) prior to this attestation, i.e., resilient attestation is provided.

It is noted that the tailored attestation feature of the present invention is not limited to VoIP services, and it can support a variety of security policies in different application scenarios. The mechanisms of the present invention are flexible enough to allow a remote party to define its own security policy and verify, through tailored attestation. For example, a media distribution company can check that users run a Digital Rights Management (DRM) module in their media player; an e-commerce website or a bank may require that customers use a secure transaction module isolated from the rest of the browser; and a military organization may want to verify that the file system manager implements a Multilevel Security (MLS) policy in their computers deployed in the field. In these various usage models, the certificate C signed by the processor may vouch for more than the encryption key EK. For example, it can vouch for a result produced by the critical module or for data inputs used to configure the module.

Having thus described the invention in detail, it is to be understood that the foregoing description is not intended to limit the spirit or scope thereof. What is desired to be protected is set forth in the following claims.

What is claimed is:

1. A system for providing processor-based security, comprising:
a processor chip having a processor core, a cache memory, a plurality of registers for storing at least one hash value and at least one encryption key, a memory interface, and at least one on-chip instruction for creating a secure memory area in a memory external to the processor chip, the processor chip encrypting data written to, and decrypting data read from, the external memory using the at least one encryption key and verifying data read from the external memory using the at least one hash value; and a hypervisor program executed by the processor chip, the hypervisor program and the processor chip creating a secure storage area for at least one trusted software module in response to launching of the at least one trusted software module, the hypervisor program and the processor chip creating a plurality of secure storage areas upon launching of a plurality of trusted software modules,
wherein the plurality of secure storage areas comprises a first secure storage area in a non-volatile memory external to the processor chip, and the processor stores in the plurality of registers a second hash value and a second encryption key as trust anchors for the first secure storage area, and wherein the processor chip encrypts data written to, and decrypts data read from, the non-volatile memory using the second encryption key and verifies data read from the non-volatile memory using the second hash value.

2. The system of claim 1, wherein the processor chip generates a power-on key value for protecting the external memory after a re-boot event, and stores the power-on key value in one of the plurality of registers.

3. The system of claim 1, wherein the hypervisor program is pre-programmed to parse a plurality of security segment data structures associated with a plurality of trusted software modules to determine security requirements for each of the plurality of software modules.

4. The system of claim 3, wherein the hypervisor program computes a third hash value over code corresponding to at least one of the plurality of software modules and stores the third hash value in one of the plurality of registers as the software module currently executing on the processor.

5. The system of claim 4, wherein the hypervisor program computes a fourth hash value using a security segment corresponding to at least one of the plurality of software modules and a trust domain.

6. The system of claim 3, wherein the hypervisor program constructs a module state table for monitoring the current states of the plurality of trusted software modules and generates an encryption key and a hash value as trust anchors for a secure storage area for each trusted software module, and wherein the encryption keys and the hash values for the plurality of trusted software modules are stored in the first secure storage area.

7. The system of claim 3, wherein the hypervisor program allows at least two modules to share a pre-defined part of a secure memory area.

8. The system of claim 3, wherein the hypervisor program allows a first trusted software module to securely invoke a second software module and to subsequently return securely to the first trusted software module.

9. The system of claim 3, wherein the plurality of trusted software modules form a trusted domain executing on the processor chip.

10. The system of claim 3, wherein the plurality of trusted software modules form part of at least two trusted domains.

11. The system of claim 1, wherein the hypervisor program and the processor chip generate a run-time attestation report including information about a plurality of software modules launched and executed by the hypervisor and the microprocessor.

12. The system of claim 11, wherein the processor chip transmits the attestation report to a remote software application in response to a request for a trusted computing service.

13. The system of claim 1, wherein at least one of the plurality of secure storage areas is assigned to an operating system module, and the operating system module cannot access another of the plurality of secure storage areas.

14. The system of claim 1, wherein the hypervisor includes an associated hypervisor secure storage area that is protected by a hypervisor hash value and a hypervisor encryption key stored in the plurality of registers of the processor chip.

15. The system of claim 14, wherein the hypervisor secure storage area includes pairs of encryption keys and hash values, each of said pairs protecting an associated secure storage area for a trusted software module.

16. The system of claim 1, wherein at least two of the plurality of trusted software modules are assigned to the same trusted domain and can access each other's secure storage areas.

17. The system of claim 1, wherein the processor chip includes an on-chip tree root stored on the chip for creating a memory integrity tree that includes a plurality of page trees, each of the page trees associated with a memory page in the secure memory area.

18. The system of claim 17, wherein the on-chip tree root includes a plurality of page trees associated with data currently in the memory pages and with pages swapped out of memory and to a disk.

19. The system of claim 17, wherein the plurality of page trees include integrity checking values for determining whether contents in the memory pages have been changed.

20. A method for providing processor-based security, comprising the steps of:

parsing a security segment data structure associated with a software module to determine security requirements for the software module; instructing a processor chip having a processor core, a cache memory, a plurality of registers for storing at least one hash value and at least one encryption key, a memory interface, and at least one on-chip instruction for creating a secure memory area in a memory external to the processor to execute the at least one on-chip instruction to create a secure memory area in a memory external to the processor for use by the software module; assigning the software module to the secure memory area so that the software module can execute using the secure memory area; encrypting data written to, and decrypting data read from, the secure memory area using the at least one encryption key stored in the plurality of registers in the processor chip;

verifying data read from the secure memory area using the at least one hash value stored in the plurality of registers in the processor chip; creating a secure storage area in a non-volatile memory for the software module; storing a second hash value and a second encryption key in the plurality of registers; encrypting data written to, and decrypting data read from, the non-volatile memory using the second encryption key; and verifying data read from the non-volatile memory using the second hash value.

21. The method of claim 20, further comprising generating a power-on key value for protecting the external memory after a re-boot event, and storing the power-on key value in one of the plurality of registers.

22. The method of claim 20, further comprising parsing a plurality of security segment data structures associated with a plurality of trusted software modules to determine security requirements for each of the plurality of software modules.

23. The method of claim 22, further comprising computing a third hash value over code and data corresponding to at least one of the plurality of software modules and storing the third hash value in a module state table.

24. The method of claim 23, further comprising computing a fourth hash value using a security segment corresponding to at least one of the plurality of software modules and a trust domain.

25. The method of claim 22, further comprising constructing a module state table for monitoring the current states of the plurality of trusted software modules.

26. The method of claim 22, further comprising allowing at least two modules to share a pre-defined part of a secure memory area.

27. The method of claim 22, further comprising allowing a first software module to securely invoke a second software module.

28. The method of claim 20, further comprising generating a run-time attestation report including information about a plurality of software modules launched and executed by the hypervisor and the microprocessor.

29. The method of claim 28, further comprising transmitting the attestation report to a remote software application in response to a request for a trusted computing service.

* * * * *